United States Patent
Kinnebrew et al.

(10) Patent No.: US 9,573,064 B2
(45) Date of Patent: Feb. 21, 2017

(54) VIRTUAL AND LOCATION-BASED MULTIPLAYER GAMING

(75) Inventors: Peter Tobias Kinnebrew, Seattle, WA (US); Nicholas Ferianc Kamuda, Seattle, WA (US); Aron B. Kantor, Los Angeles, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 633 days.

(21) Appl. No.: 12/822,517

(22) Filed: Jun. 24, 2010

(65) Prior Publication Data

US 2011/0319148 A1 Dec. 29, 2011

(51) Int. Cl.
A63F 13/10 (2006.01)
A63F 13/65 (2014.01)
A63F 13/216 (2014.01)

(52) U.S. Cl.
CPC ............. *A63F 13/65* (2014.09); *A63F 13/216* (2014.09); *A63F 2300/205* (2013.01); *A63F 2300/5566* (2013.01); *A63F 2300/5573* (2013.01); *A63F 2300/69* (2013.01); *A63F 2300/8082* (2013.01)

(58) Field of Classification Search
USPC ................................. 463/1, 31, 42
See application file for complete search history.

(56) References Cited

U.S. PATENT DOCUMENTS

| | | |
|---|---|---|
| 2003/0101225 A1 | 5/2003 | Han et al. |
| 2003/0224855 A1 | 12/2003 | Cunningham |
| 2006/0105838 A1* | 5/2006 | Mullen .......................... 463/31 |
| 2006/0223637 A1* | 10/2006 | Rosenberg ...................... 463/47 |
| 2007/0123353 A1* | 5/2007 | Smith ..................... A63F 13/12 463/42 |
| 2007/0265089 A1* | 11/2007 | Robarts et al. ................. 463/42 |
| 2008/0133336 A1 | 6/2008 | Altman et al. |
| 2008/0280676 A1* | 11/2008 | Distanik et al. ............... 463/29 |
| 2009/0215469 A1 | 8/2009 | Fisher et al. |
| 2009/0215536 A1* | 8/2009 | Yee et al. ........................ 463/42 |
| 2010/0131530 A1 | 5/2010 | Gibson et al. |

(Continued)

FOREIGN PATENT DOCUMENTS

| | | |
|---|---|---|
| CN | 1915469 A | 2/2007 |
| KR | 20090018425 A | 2/2009 |

(Continued)

OTHER PUBLICATIONS

Toyama, Kentaro, et al., "Probabilistic Tracking in a Metric Space," Eighth International Conference on Computer Vision, Vancouver, Canada, vol. 2, Jul. 2001, 8 pages.

(Continued)

*Primary Examiner* — Tramar Harper
(74) *Attorney, Agent, or Firm* — Micah Goldsmith; Judy Yee; Micky Minhas

(57) ABSTRACT

A system and method combining real-world actions and virtual actions in a gaming environment. In one aspect, a massively multiplayer environment combines the real world actions and virtual actions of a participant to influence both character metrics and game play within one or more games provided by the service. In the real world or location-based events, game play occurs in and around links explicitly created between real world locations and virtual representations of those locations within the game.

20 Claims, 24 Drawing Sheets

(56) References Cited

U.S. PATENT DOCUMENTS

| | | | |
|---|---|---|---|
| 2010/0164990 A1* | 7/2010 | Van Doorn | 345/633 |
| 2011/0081973 A1* | 4/2011 | Hall | 463/42 |
| 2011/0183754 A1* | 7/2011 | Alghamdi | 463/31 |
| 2011/0242134 A1* | 10/2011 | Miller et al. | 345/633 |
| 2012/0122570 A1* | 5/2012 | Baronoff | 463/31 |
| 2012/0231887 A1* | 9/2012 | Lee et al. | 463/39 |

FOREIGN PATENT DOCUMENTS

| | | | |
|---|---|---|---|
| WO | WO 0220111 A2 * | 3/2002 | |
| WO | WO 03095050 A2 * | 11/2003 | |

OTHER PUBLICATIONS

Notification of Transmittal of the International Search Report and The Written Opinion, dated Jan. 19, 2012, for International Appl. No. PCT/US2011/040791, filed Jun. 16, 2011.

Supplementary European Search Report dated Apr. 8, 2013, in EP Patent Appl. No. 11798664.6 filed Jun. 16, 2011.

Office Action dated May 27, 2013, European Patent Application No. 11798664.6, filed Jun. 16, 2011.

Response to Office Action dated Sep. 23, 2013, European Patent Application No. 11798664.6.

Office Action dated Dec. 12, 2014, Chinese Patent Application No. 201180031297.2 filed Jun. 16, 2011.

Response to Office Action dated Aug. 12, 2014, Chinese Patent Application No. 201180031297.2.

English translation of the Summary of the Arguments and Amended Claims filed in Response to Office Action dated Aug. 12, 2014, Chinese Patent Application No. 201180031297.2.

Office Action dated Apr. 3, 2014, Chinese Patent Application No. 201180031297.2.

Response to Office Action filed Feb. 27, 2015, Chinese Patent Application No. 201180031297.2 filed Jun. 16, 2011.

Response to Office Action with English Summary dated Sep. 17, 2015 in Chinese Patent Application No. 201180031297.2, 4 pages.

Office Action dated Jul. 2, 2015 with English Summary in Chinese Patent Application No. 201180031297.2, 6 pages.

Office Action with English translation dated Jan. 27, 2016 in Chinese Patent Application No. 201180031297.2, 6 pages.

Response to Office Action with English translation of amended claims dated Feb. 5, 2016 in Chinese Patent Application No. 201180031297.2, 7 pages.

Notice of Allowance with English translation dated Mar. 2, 2016 in Chinese Patent Application No. 201180031297.2, 7 pages.

* cited by examiner

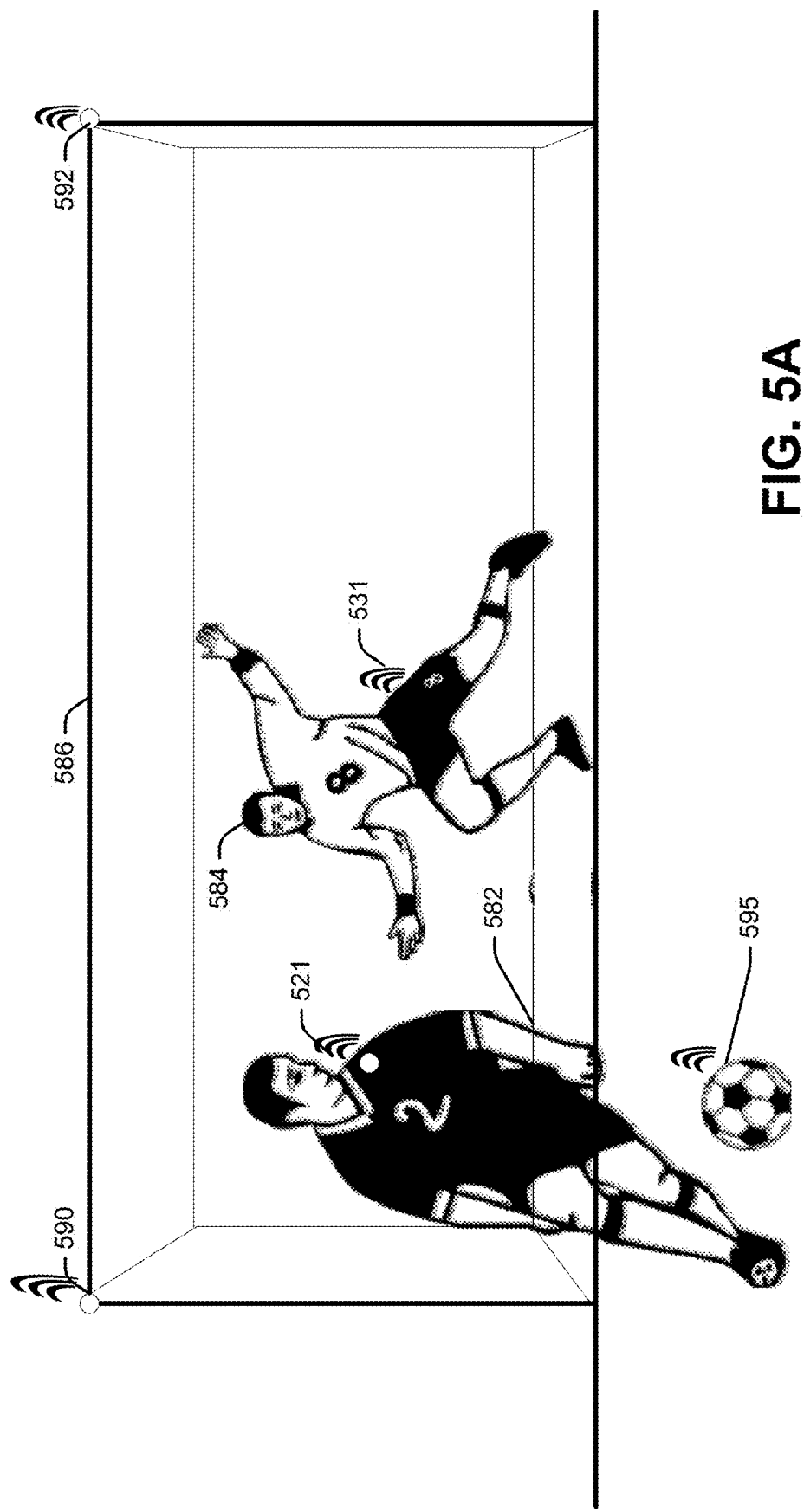

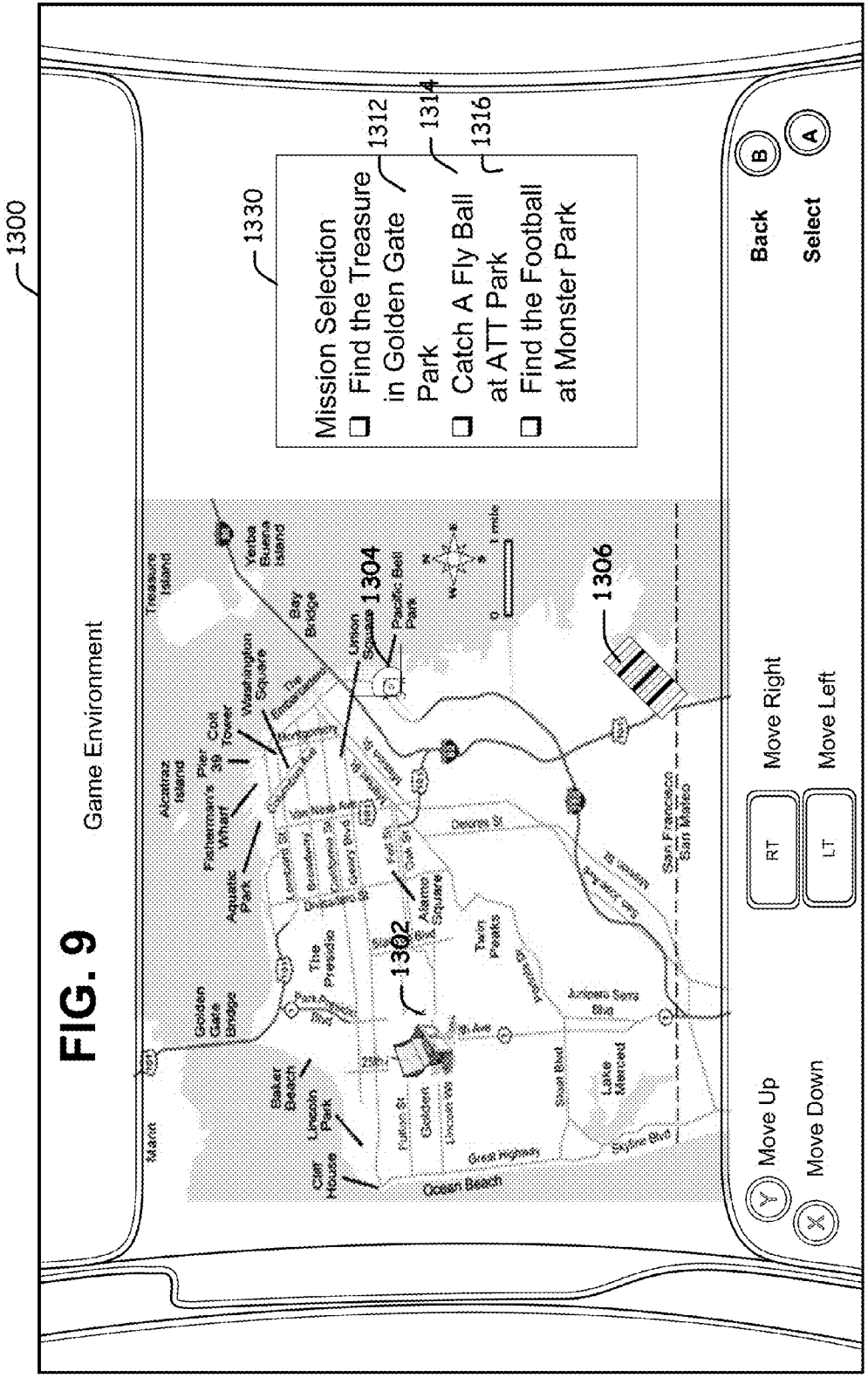

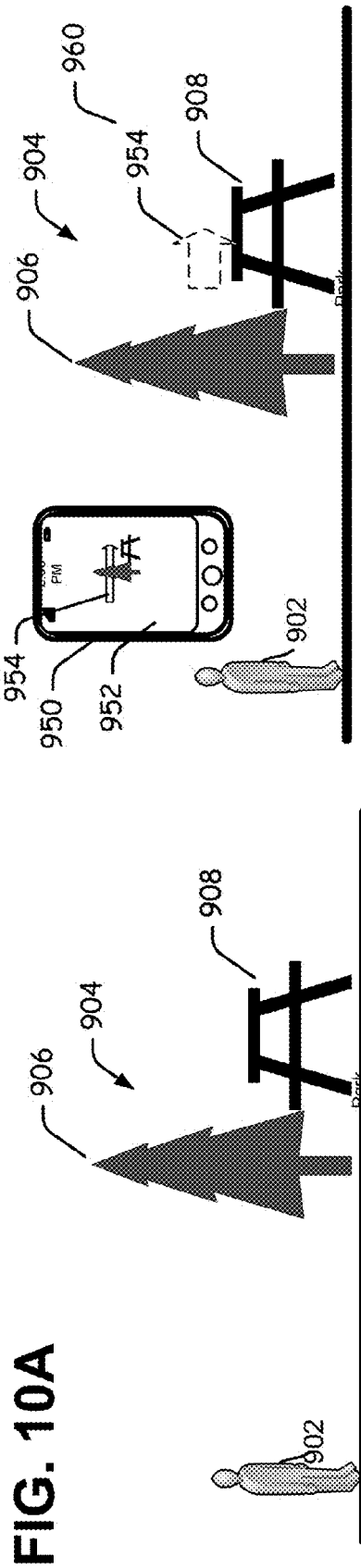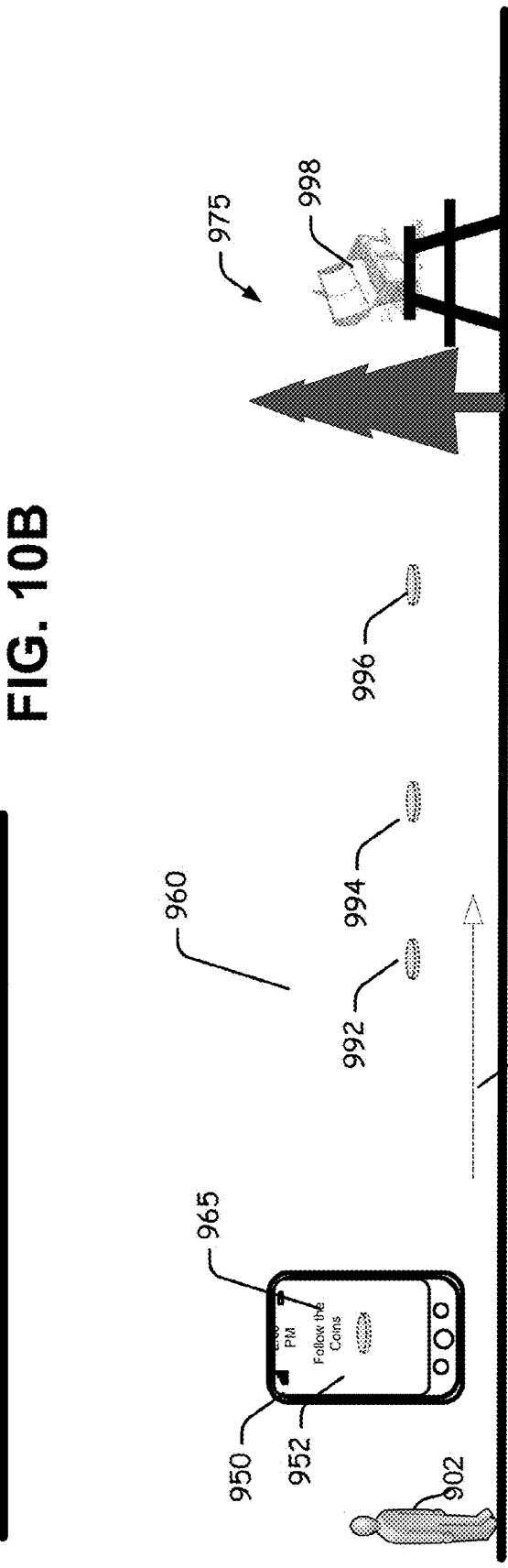

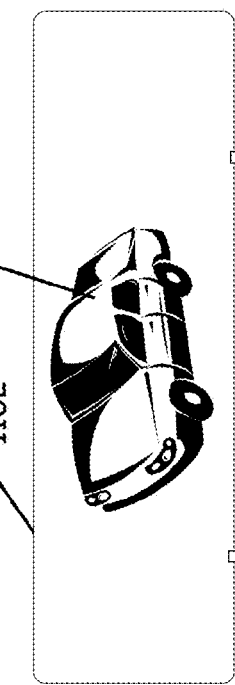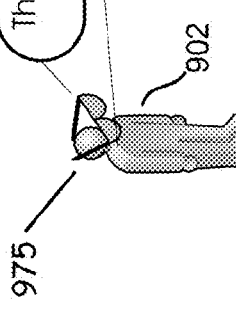

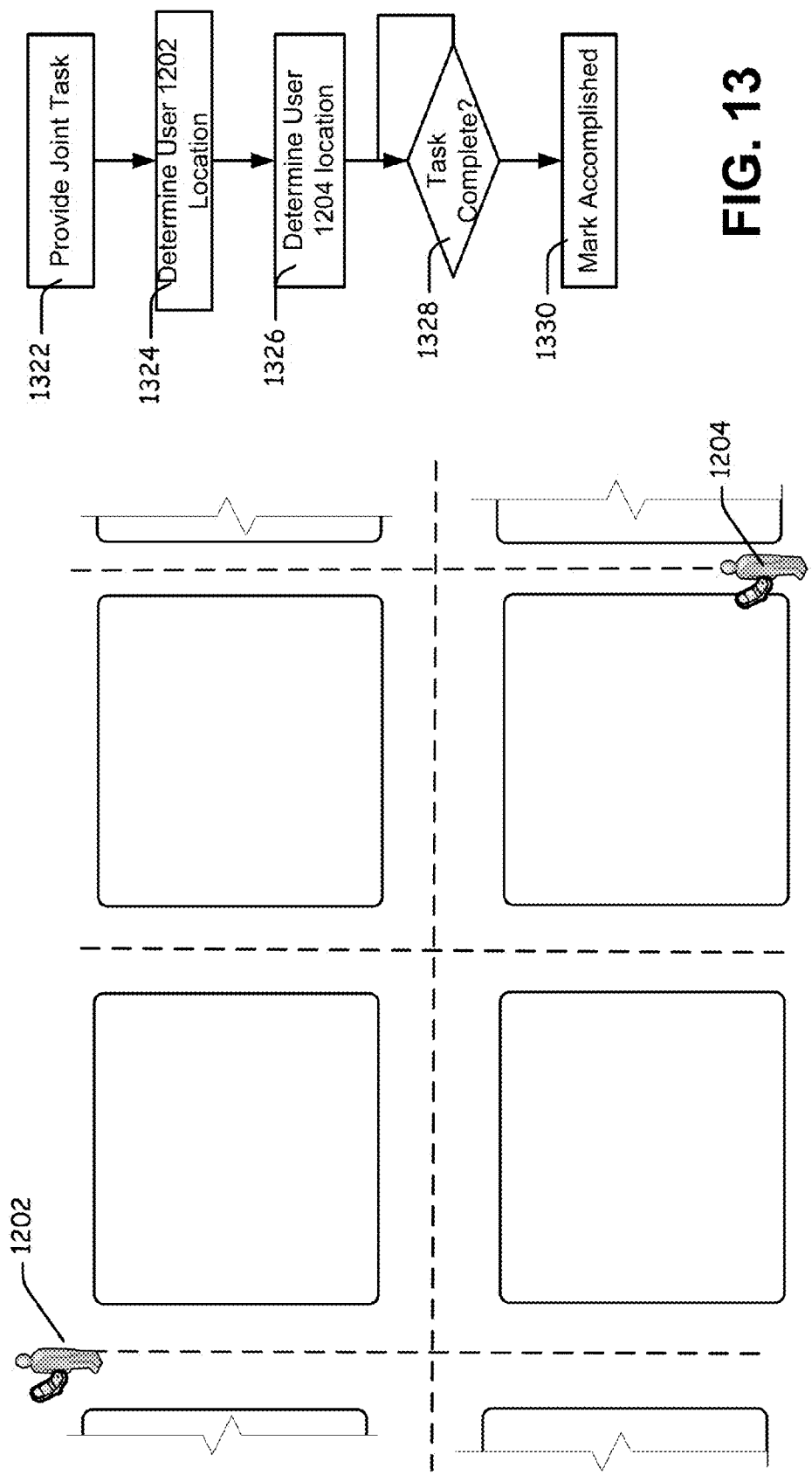

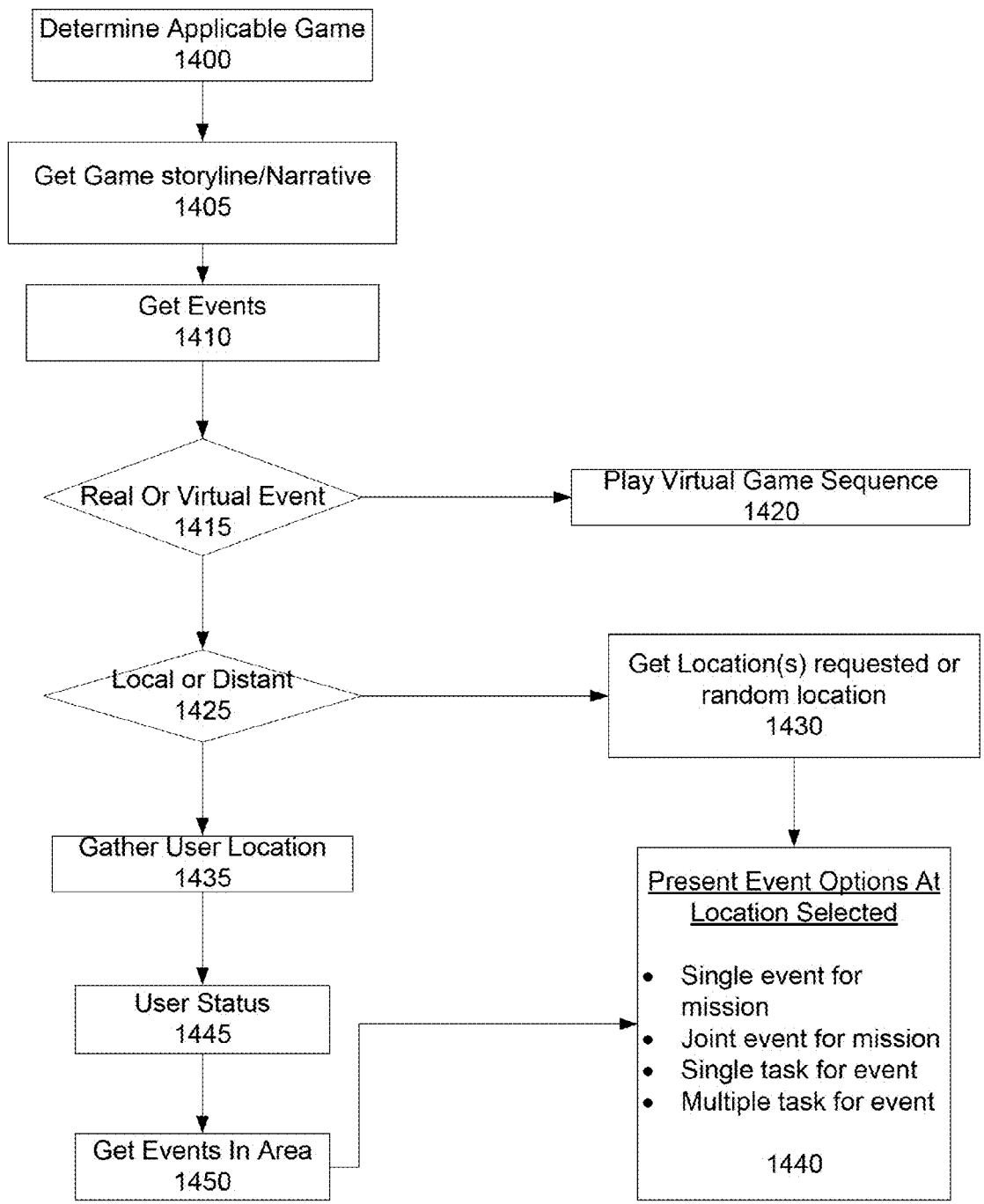

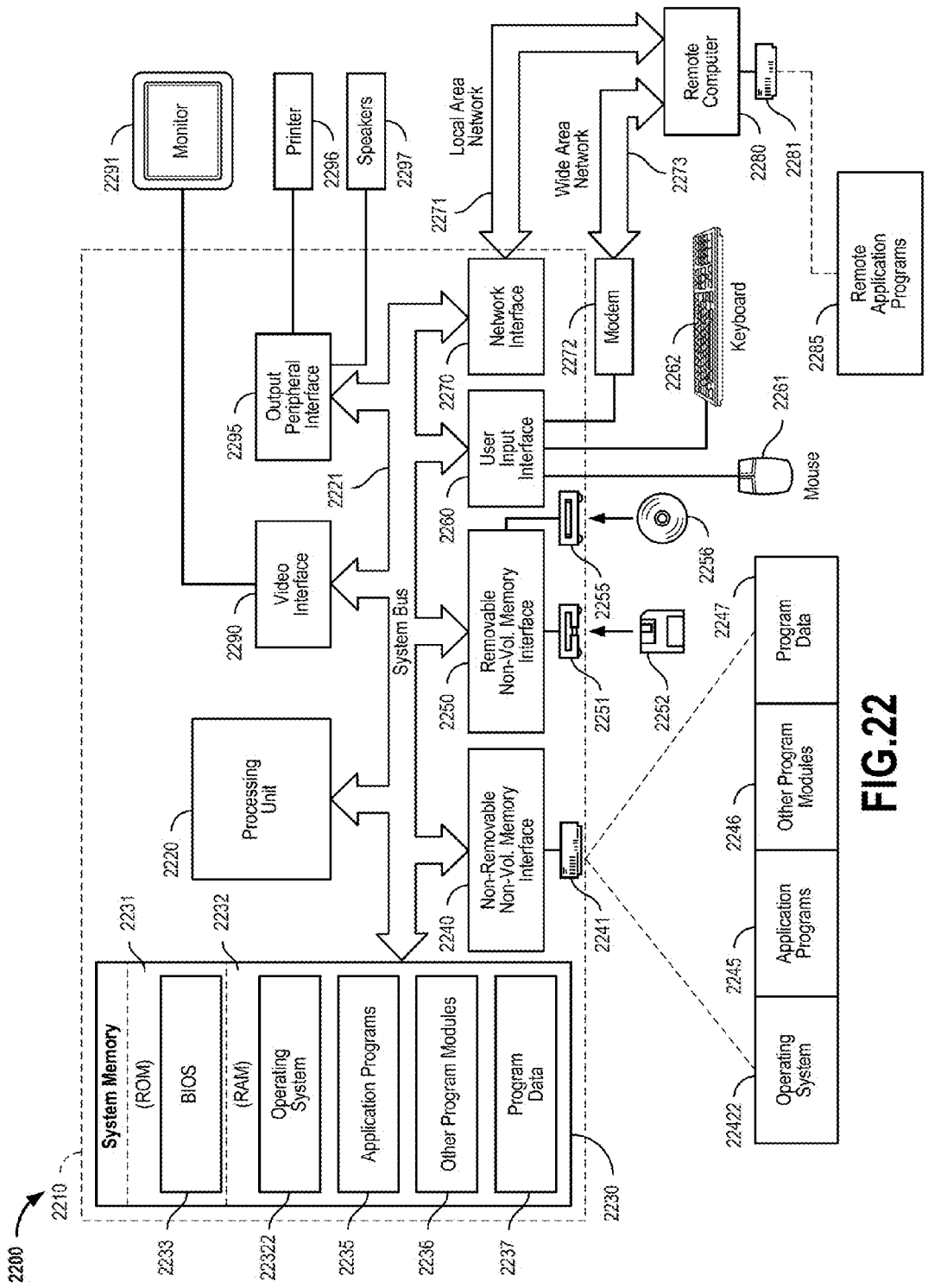

VIRTUAL AND LOCATION-BASED MULTIPLAYER GAMING

BACKGROUND

The console and personal computer-based video game experience has evolved from one in which an isolated gaming experience was provided into one in which users on a variety of processing devices such as personal computers and mobile devices can interact with each other to share a common game experience. One example of a system that enables users to communicate with each other is Microsoft's Xbox 360 Live® online game service. Using such systems, users are provided with a rich interactive experience which may be shared in real time between friends and other gamers.

Massively multiplayer games have been popularized by the availability of the internet. Such games allow players located all over the world to participate in the game under the control of a service administrator. Such games can provide an environment for social interaction between players.

Other types of social interaction are provided by social networks. Location-based social systems allow users to share information on their location-based activities with friends using the same system. Some location-based social networks provide users with incentives to visit locations and "check in" once present at the location.

SUMMARY

Technology is described for combining real-world actions and virtual actions in a gaming environment. In one aspect, the technology presented provides a massively multi-player location-based gaming environment or service. The massively multiplayer environment combines the real world actions and virtual actions of a participant to influence both character metrics and game play within one or more games provided by the service. In the real world or location-based events, game play occurs in and around links explicitly created between real world locations and virtual representations of those locations within the game.

In one embodiment, the technology is implemented in a method of providing a game including a plurality of events comprising a story associated with a character. A number of location-based and virtual based events contributing to user progress in the story are provided. User participation in at least one location-based event and at least one virtual event advancing user progress in the story are received. User progress is moved forward on successful completion of each of the events.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 5A is an illustration of two individuals 582 and 584 engaged in a live, location-based soccer game.

FIG. 9 illustrates a task selection interface 900 in, for example, a narrative based game.

FIGS. 10A through 10C illustrate presenting a user 902 with a location-based event using an augmented reality view in a processing device.

FIGS. 11A and 11B illustrate another alternative environment wherein an augmented reality is presented to the user.

FIG. 12 is a block diagram and

FIG. 13 a flow chart illustrating use of a multi-user mission, including a simultaneous multiuser mission.

FIG. 14 is a flow chart illustrating a process to present available events to a user.

FIG. 22 illustrates an example of a suitable computing system environment.

DETAILED DESCRIPTION

Technology is described for combining real-world actions and virtual actions in a gaming environment. In one aspect, the technology presented provides a massively multi-player location-based gaming environment or service. The massively multiplayer environment combines the real world actions and virtual actions of a participant to influence both character metrics and game play within one or more games provided by the service. User actions within a particular game offered by the service may take place in either a virtual environment, such as a gaming console, mobile computing device, dedicated gaming device or web browser, or in locations the real world. In real world actions, a user participates in game related activities which in one embodiment, are tied to a user's location and movements. In the real world or location-based events, game play occurs in and around links explicitly created between real world locations and virtual representations of those locations within the game.

The massively multi-player location-based gaming service in accordance with the present technology may be utilized with any of a number of different types of games, including games based on a story narrative, or theme based games, such as sports games. Any number of different categories of games exist, including action games including first person shooting games, action adventure games featuring long term obstacles as well as components of action games, simulation-type games based on construction or life simulation, role playing games where a user is cast in a particular role in one or more adventures which may or may not utilize specific skill sets, strategy games, vehicle simulation games, music games, and any of a number of other types of games. In each of the aforementioned genres, the technology herein allows use of real world events and virtual events to establish metrics for advancing game play. Any of a number of different types of game interfaces may be utilized, including an audio interface, a browser-based interface, text based interface, a title based interface, a console based interface, a mobile computing device interface, a processing device such as a personal computer or game console, or any of a number of different types of interfaces.

In the context of this description, the technology will be illustrated with respect to a narrative game example, specifically a bank robbery game, and a theme based game example, specifically a soccer game.

Figure 1:
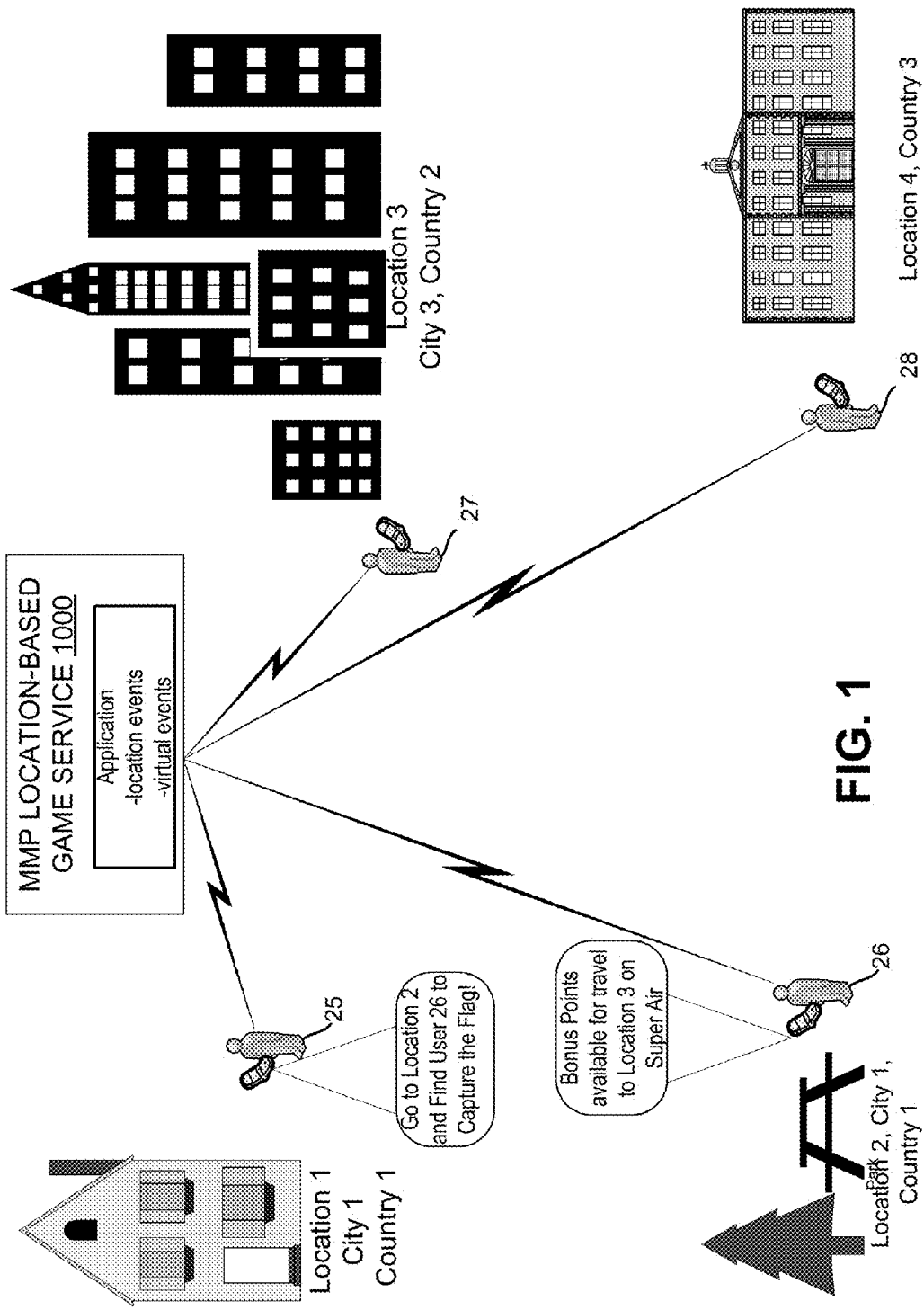
FIG. 1 depicts a block diagram of a massively multi-player location-based game service 1000.

FIG. 1 illustrates a general overview of one embodiment of the present technology. A massively multi-player location-based game service 1000 serves a plurality of users 25, 26, 27, 28 in various locations (location 1, location 2, location 3, location 4), which may be in various countries. Location 1 is located in city 1 and country 1, and location 2 may be located in city 1 in the same country. Location 3 is located in a different city, city 3, and a different country, country 2. Location 4 is located in yet a third country, country 3. All the users 25-28 are connected via one or more processing devices to the location-based game service 1000. Users can interact in one or more games as discussed below.

Each of the various users may have associated therewith a processing device which provides location and/or virtual based game information and directs users to location and virtual events which are linked to a common game provided by massively multi-player location-based game service 1000. As shown in FIG. 1, user 25 can receive information directing him to a specific location—that of user 26. User 26 receives a message indicating bonus points in the game can be achieved by completing a travel event on "Super Air". Various events and game types are supported in the context of the technology.

Figure 2:
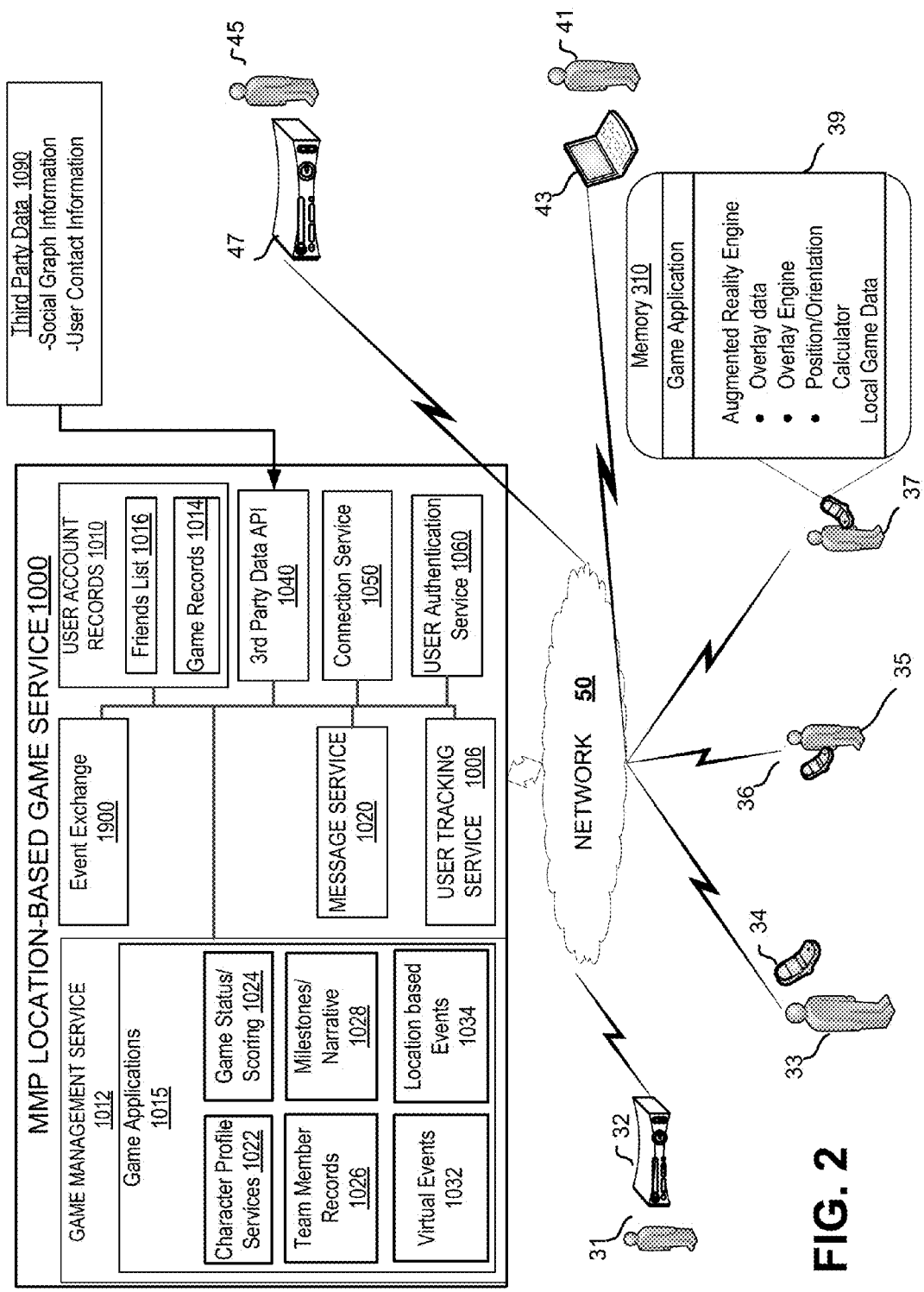
FIG. 2 is a second block diagram massively multi-player location-based game service 1000.

FIG. 2 illustrates a block diagram of a system for implementing the technology presented herein. A massively multi-player location-based game service 1000 may include, for example, game management services 1012, user account records 1010, a messaging service 1020, a user tracking service 1006, a connection service 1050, a user authentication service 1060, a third party application programming interface 1040, and a event exchange 1900. Game management services 1012 can include one or more game applications 1015. Each game application may provide character profile services 1022, game status and scoring services 1024, team member records 1026, milestone and narrative records 1028, virtual events 1032, and location-based events 1034. User account records 1010 may include a friend's list 1016 and specific game records 1014. The user account records may include user's scores in any of the game applications 1015 provided by the service.

In FIG. 2, a number of users 31, 33, 35, 37, 41, 45 and 60-72 are illustrated. Each user has associated therewith a respective processing device such as a console 32, mobile devices 34, 36 and 39, a notebook computer 43 and console 47. Users and their associated processing device may communicate with massively multi-player location-based gaming environment or service 1000 via network 50. Network 50 may comprise any number of public or private networks, such as the Internet.

As noted above, any number of different types of gaming applications 1015 may be provided. In one context, games will have rules and narratives which define events used by players to advance through the game narrative or based on the game theme. Advancing can comprise scoring, completing achievements, or progressing through the narrative within the game. Progress and scoring within the game is defined by the game status and scoring service 1024. Theme milestones and narrative 1028 will define the narrative of the game, or specific milestones which must be achieved by performing one or more of the virtual events and location-based events 1034. Events may comprise one or more individual tasks. An example of an event might be a soccer game, and an example of a task within the soccer game might be to score a goal. In a narrative based game, an example of event might be to find a treasure in a specific location, with a task within the event to be to follow a particular route and collect certain milestones on the way to the particular treasure.

Character profile services 1022 track specific characteristics of a game character within a game. A character may be associated with a unique user. A user's character within a game can have characteristics which are defined by the game. For example, in a soccer game a player may have speed, strength, and agility characteristics, all of which are defined for the particular character and which may affect game play. In games where users interact with other users, team member records 1026 may be stored. Team member records 1026 may include, for example, other real users which are members of a given user's soccer team and play with the user during events. Team member records may be a sub-set of a user's friends on a social networking service, or unrelated to a user's social networking friends.

Virtual events 1032 may or may not have equivalent real world events. Virtual and location-based equivalents are discussed below with respect to FIG. 3B. Virtual events are events which are performed using a virtual environment provided by a processing device. In one example, a virtual event might be a video game version of a soccer game. In this example, a soccer game has a real world, location-based equivalent: a real soccer game on a real field. The real soccer game would be a location-based event since it occurs at a particular location and, as discussed herein, may be tracked by the location-based game service 1000. Other virtual events, such as slaying a dragon, might not have location-based equivalents.

Location-based events 1034 are events which may occur in and around links created between a real world location and a game event. In an exemplary location-based event, a user may be directed to a particular location at a particular time, and may have to position himself or herself and acquire a particular item at that time. In one example, a user may be directed to a particular coffee house to purchase a particular type of drink at a designated time by the location-based event. The event will be completed when the purchase is made at the location at the particular time. Thus, location-based events may have characteristics including one or more specified locations, times, character associations and tasks.

User positioning at an event is determined by the user tracking service 1006. Tracking services may be performed using a geographic positioning system (GPS) or other technologies as described herein, which are provided on user processing devices.

A user ID uniquely identifies the user 37 to the location-based game service. A user authentication service 1060 allows game players to authenticate themselves to the massively multi-player location-based gaming service 1000. Authentication is desirable since it allows users to ensure that their activities are tracked uniquely within the system. A user tracking service 1006 maintains position information on each of the users 31, 33, 35, 37, 41, 45 which are utilizing the location-based gaming service 1000. User tracking services can be provided, as described above, by a GPS service, and/or by a specific game application (39) resident in the user's processing device.

As illustrated in FIG. 2, each processing device may have associated therewith a game application 39. Although in FIG. 2 only one application 39 is illustrated in a device memory 310 (described below with respect to FIG. 21), it will be understood that each device 32, 34, 36, 38, 43, 37 may include an equivalent client-based game application. In one embodiment, no separate game application 39 need be utilized with the present technology.

Each game application 39 may include a augmented reality engine which provides game information to a user interface (318—FIG. 21) and provides data which allows the location-based gaming service 1000 to provide an enhanced gaming experience to each of the users. In the example illustrated in FIG. 2, a game application includes overlay data, an overlay engine, a position/orientation calculator and local game data. The local event data may include one or more location-based events which have been received from the location-based gaming service 1000. As discussed below, events may comprise elements of one or more games provides by the multiplayer service. The local events may be stored for more rapid access by the processing device when the device is unable to communicate with the location-based gaming service, or to enable more responsive game play.

The overlay data and overlay engine may comprise location coded information which is provided to the processing device or peripheral to allow the processing device to present an alternative reality view to a user 37. Various examples of alternative reality views are presented herein. One example of an alternative reality view is to place icons or tokens within the viewing screen of a mobile processing device. Another example is to place tokens on a mapping service. Many mobile processing devices, such as that illustrated in block form in FIG. 21, include an onboard camera which provides a field of view image to the user interface of the camera. This real time image can be overlayed with tokens and overlay data using the overlay engine to present information on game events for the player. Other technologies, such as head mounted displays and other augmented reality technologies, can be utilized in accordance with the present technology.

The position/location calculator may be a sensor which provides more fine grained location information to the massively multi-player location-based game service 1000, or code for instructing the processor of a computing device to more accurately determine player position based on information in the scene of the camera. The position/location calculator can include, for example, image recognition technologies allowing scene capture information to be matched with a scene database, allowing the service 1000 to more accurately define the position of a user relative to the global positioning service. For example, geometric building lines which appear in the view of a mobile processing device can be computed and used to identify the exact position of a phone given a number of expected positions of geometric lines based on the known position of the phone and the known orientation of the phone. This information can be used in conjunction with GPS information to determine a position and orientation for a user. In one example, once the system knows where a mobile processing device is relative to the global positioning system, scene information (an image captured by the phone) can be used to calculate the exact position on the phone based on a knowledge of what buildings or other geographical features should appear within that image or might appear within that image given the proximity of the phone to a particular location. Known landmarks can be calculated in the exact position of the phone determined.

Third party data 1090 can be incorporated into the multiplayer gaming server service 1000. Third party data 1090 can include social graphing information and user contact information which the user has provided the location-based gaming service 1000 with access to via a third party application programming interface 1040. In one example, information such as a user's social graph from a user's social networking profile may be incorporated into the location-based gaming service 1000. This information may be stored in user account records 1010 and include a friend's list 1016 of a player's social networking associates. A connection service 1050 allows users operating the various processing devices illustrated in FIG. 2 to connect to each other to play games based on the location-based service 1000, or other games which are provided on each of the processing devices. A messaging service 1020 allows users to send messages to each other, and users to receive messages from the location-based gaming service 1000. An event exchange at 1900, explained more fully below with respect to FIG. 19, allows users at different locations to exchange and perform tasks which they might not otherwise be able to perform based on their remoteness to particular location-based events 1034.

Figure 3A:
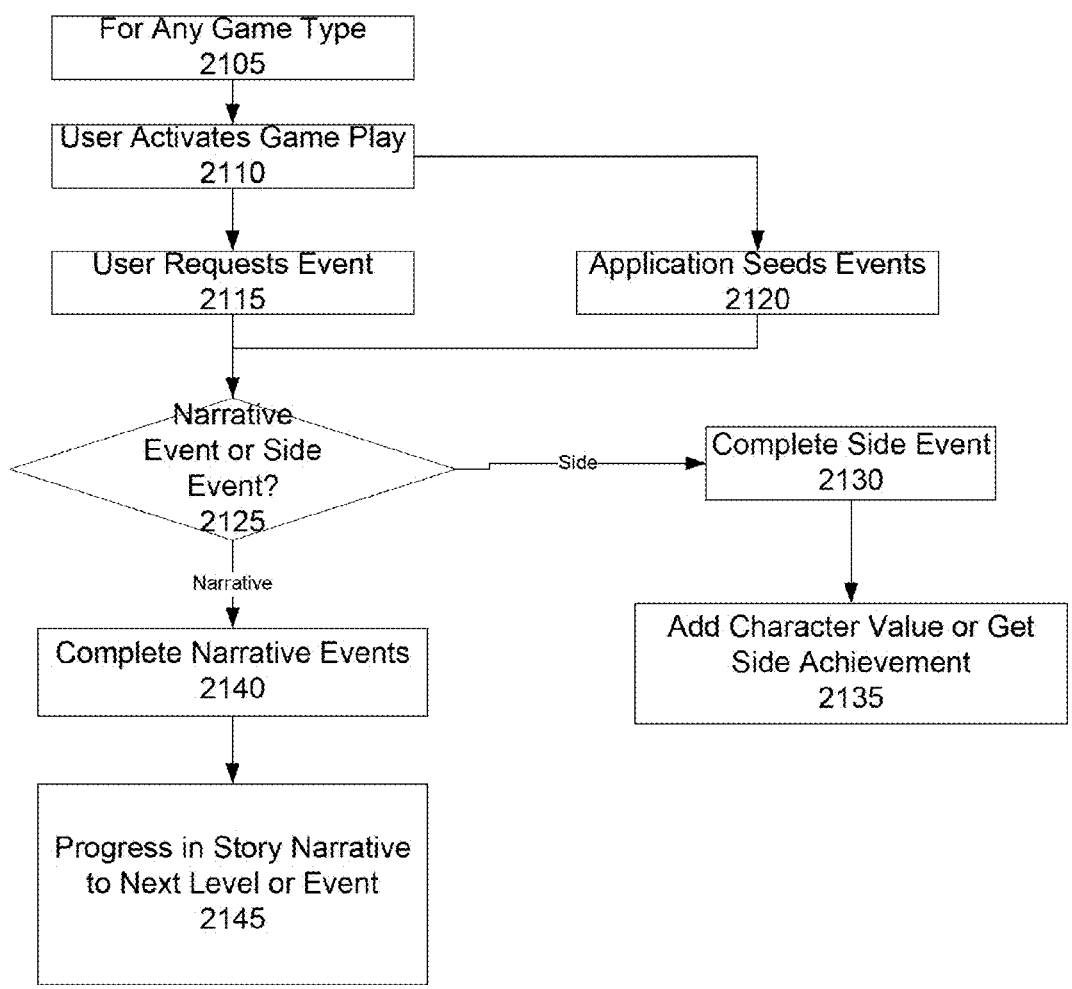
FIG. 3A is a flowchart depicting theme and narrative event flow in a game.
Figure 3B:
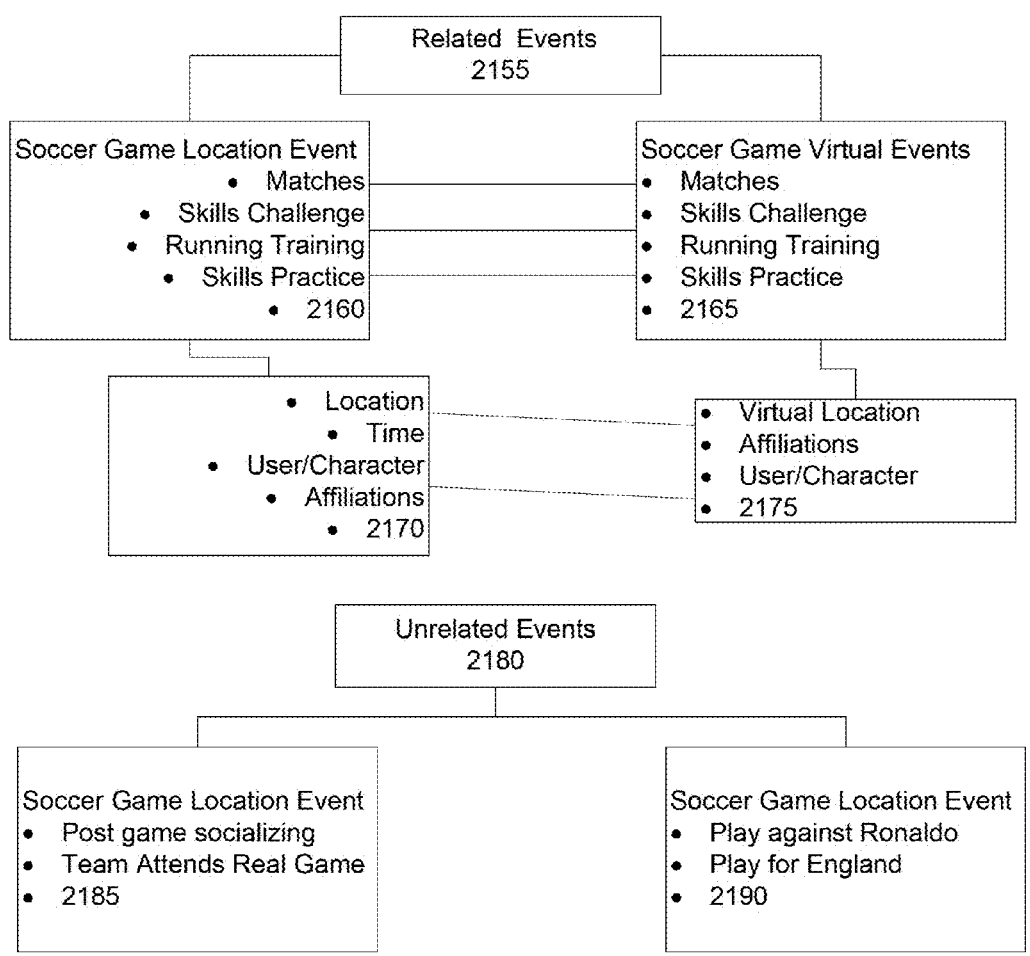
FIG. 3b is a block diagram illustrating related and unrelated events and event characteristics.

FIGS. 3A and 3B are block diagrams location-based and virtual events, and related and unrelated events. Each game will have a game theme 305. A game theme 305 may comprise any of the events within a game which may be achieved to advance a user in the game. Each theme may or may not have a narrative associated with the theme. A sports themed game will generally not include a narrative, while an adventure based game may have a narrative which is enhanced by a sequence of events.

In a soccer game, for example, game events can comprise matches, scoring levels, skill challenges, or other events. In a narrative based game, the game story may comprise a narrative which follows a particular character through a number of narrative based events along a thematic narrative which adds context to the game. In the context of a game story, both narrative events and side events may occur. A side event is an event which is not integral to progress in the game narrative or theme, but which may allow a user to acquire achievements or bonuses that present other challenges to the user or which provide skills to the user in completing the main narrative or theme.

At 2105, for any game, a user activates game play at 2110. Events may be requested by the user at 2115 or seeded by the game at 2120. A requested event includes a user identified request to perform an event, such as play a match in a soccer game. A seeded event may comprise a game generated presentation of an opportunity, such as a suggestion to play a particular soccer match at a particular time.

At 2125, a determination is made as to whether or not any particular event is a narrative event or a side event. If the event is a narrative event, the user will perform the narrative event at 2140 and progress in the story at 2145. If the event is a side event at 2132, the side event performance will add character value or allow for a side achievement at 2135. Side events include events which are an item of opportunity. Side events may be character building events and may allow the user to acquire special skills or physical attributes or weapons or separate achievements within the game.

FIG. 3B illustrates the concept of location-based events and related and unrelated events. Location-based events are those having a link between a game element and a physical, real-world location. Virtual events are those which are played in a virtual environment on a processing device. Location-based events may or may not have virtual equivalents. As illustrated in FIG. 3B, linked events 2155 may include narrative and side events and include, for example, soccer game location events 2160 such as matches, skills challenges, running training and skills practice. Each of the location-based events 3160 may have an equivalent virtual event 2165 which a player may perform in a game. Location-based events may have characteristics such as location, time, user/character strengths and affiliations with other players. Similarly, virtual events 2165 may have characteristics including a virtual location, affiliations and user/character strengths. Not all characteristics of a location-based event have equivalents in virtual events. As illustrates at 2175, virtual events may have a virtual location affiliations and user/character strengths, but may not be tied to a particular time.

Unrelated events 2180 are events that, while significant and contribute to game play, do not have real and virtual world equivalents. A soccer game location event 2185 may include post-match socializing as or a joint team outing to a real soccer match at a real location. Virtual events such as play against a famous player or playing for a national team (2190) would not have real world equivalents.

Figure 4A:
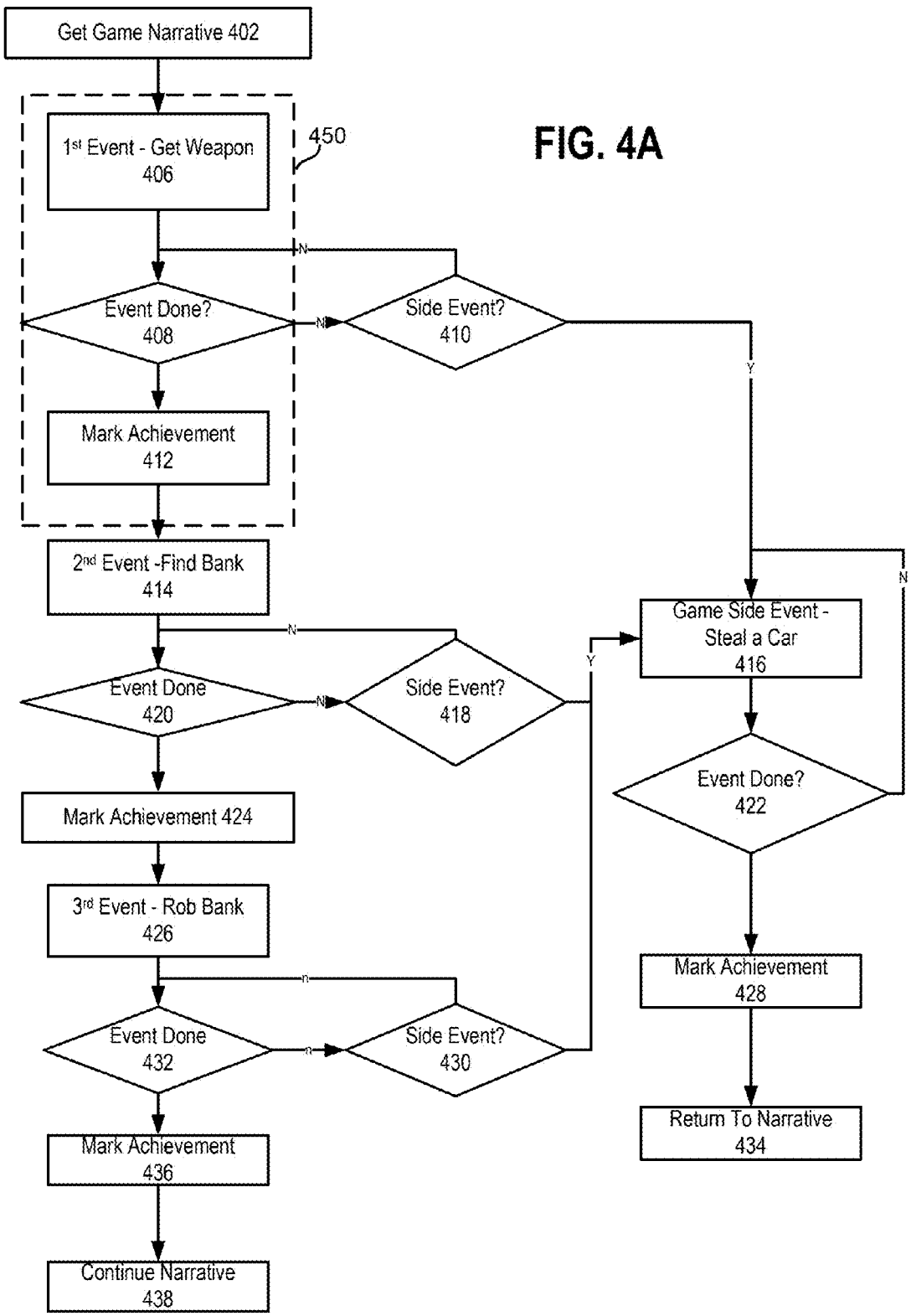
FIG. 4A is a flow chart illustrating game flow in a narrative game illustrating the relationship of narrative events to side events.

FIG. 4A is a flow chart illustrating game flow in a narrative game illustrating the relationship of narrative events to side events. In FIG. 4A, the example of a bank robbing game is utilized. At 402, the narrative and side game events are defined. In a bank robbing game, to progress the game, one might obtain a weapon, find a bank, and then rob a bank. At 406, a first narrative event will be for a player to get a weapon. At any point during a narrative game sequence, a user may choose to do a side event. At 408, a determination is made as to whether or not the event has been completed. At 406, the event may be begun and not completed, or simply never begun. If the event has not been done, it is possible that the user has engaged in a side event at 410. If the user is engaging in a side event at 410, a side event example may be to steal a car as illustrated at 416. Once the user completes the side event, the user obtains and achievement for the side event at 428 and returns to the narrative at 434. In this case, the side event—stealing a car—may contribute to the narrative event but is not necessary to progress the game. Another example of a side event would be to exercise to gain strength for additional robberies.

The return to the narrative can occur at any point before any of the events illustrated at 406, 414 and 426. Once the user completes the first narrative event at 408, the achievement is marked at 412 and a next event, in this case to find a bank 414 is presented to the user. Marking an achievement completed at 412 in the context of the game allows any subsequent events which depend on completion of the marked event can now proceed. Again, the user must perform the event at 420 in order to mark the achievement at 424 and progress to the next sequential event robbing the bank at 426. At any point along the narrative path, before each narrative event 406, 414, 426 is completed, the user may branch into a side event 410, 418, 430.

The example illustrated in 4A, side event 416 is but one of any number of different side events which may be provided to the user in the context of a bank robbing game. Once each event is completed at 408, 420, 432, the achievement is marked and the narrative continues to the next sequential event. For example, when the third event 426, robbing the bank, is completed at 432, the event is marked at 436 and the narrative continues at 438. Any number of different sequential events may occur within the context of a game narrative.

Figure 4B:
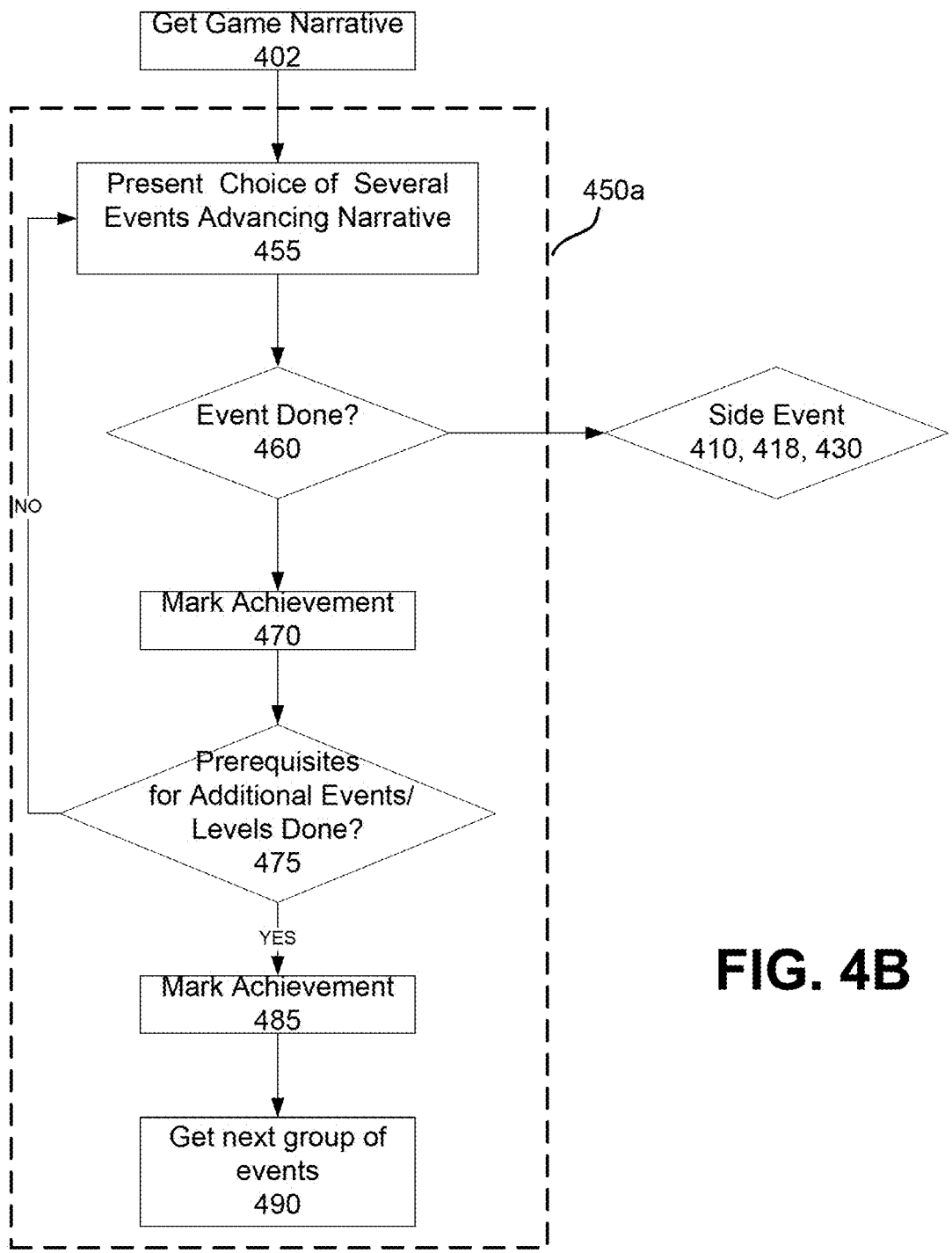
FIG. 4B is a flow chart illustrating a set of parallel events 450a which may be substituted for purely sequential events illustrated in 4A.

FIG. 4B illustrates a set of parallel events 450 which may be substituted for purely sequential events illustrated in 4A. In FIG. 4B, a set of steps 450A may compromise presenting any number of event alternatives, which may be performed in any sequence, to a user. Each of the events in a particular set 455 must be performed in order to advance in the narrative. That is, a user may be provided with three tasks which must be completed in order to advance the game. In the context of FIG. 4A, instead of performing each of the events 406, 414 and 426 in sequence, the user may be presented with the opportunity to perform the events in any order which the user desires. However all events must be performed in order to advance the game to the next level or next event in the narrative. In the example of FIG. 4A, it may be difficult to perform the third event "rob bank" 426 without performing the first event "get weapon" 406. However, any number of different examples can be considered where non-sequential events may be provided.

In FIG. 4B, at 455 a user is presented with a choice of several events in a set of events which will advance the narrative. If the event is completed at 460, the achievement is marked at 470 and a determination made at 475 as to whether all the prerequisites within the particular set of several events to advance the narrative have been completed. If not, the user is presented with the remaining choice of events at 455. Before any of the events is completed at 460, the user may branch into a side event 410, 418, 430. Once all the prerequisites for additional events and levels are completed at 475, the achievement is marked and the narrative moves forward into the next group of events at 490.

Figure 5B:
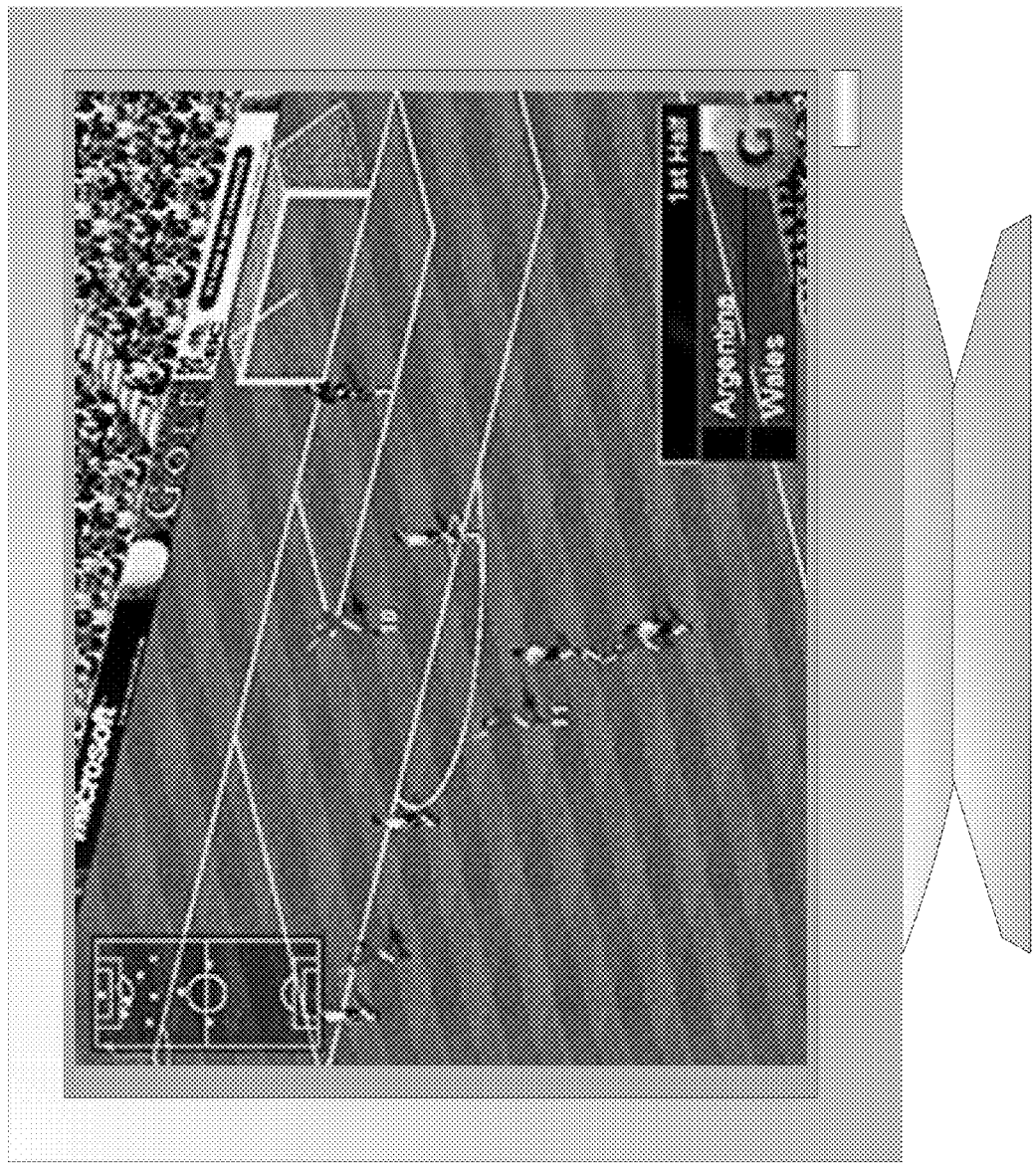
FIG. 5B is an illustration of a virtual soccer game.
Figure 6:
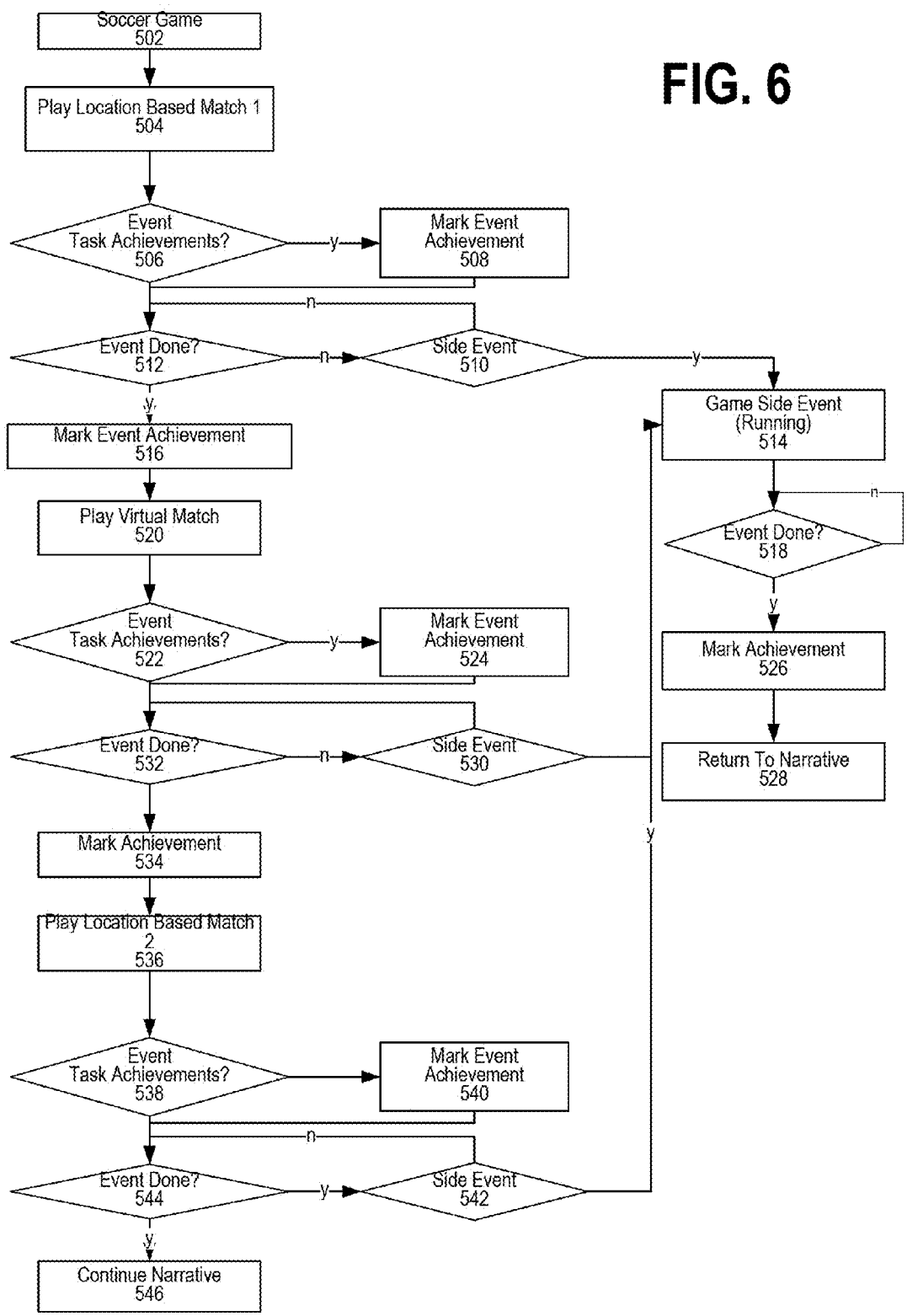
FIG. 6 is a flow chart illustrating story elements of a soccer game combining both location-based events and virtual events.

FIGS. 5A, 5B and 6 illustrate an example of a game wherein the game story is thematic rather than narrative in nature. FIGS. 5 and 6 also illustrate the use of a location-based event in combination with a virtual event. FIG. 5A is an illustration of two individuals 582 and 584 engaged in a live, location-based soccer game. FIG. 5B is an illustration of a virtual soccer game.

In FIG. 5A, user 582 is attempting to score a goal in a soccer goal 586 against user 584. In one context, both user 582 and user 584 are both participants in the location-based game service 1000. The interaction between user 582 and 584 may be relevant and may be a location-based event in a context of the location-based game service 1000. The activities between the users, the result of the game, and the fact that the game occurred may all be relevant in the context of a soccer game which both the users are participating in. Likewise, user 582 may play user 584 in the video game illustrated in FIG. 5B. This virtual event may add to the context of the soccer game illustrated in FIG. 6.

FIG. 6 is a flow chart illustrating story elements of a soccer game combining both location-based events and virtual events. In FIG. 6, events for a multiplayer location-based soccer game are retrieved at 502. A first event in the soccer based story may be, for example, to play a real match which is a location-based event. The event may take place at a particular place and time, or may take place at a particular place at any time. In another context, the place and time need not be defined. Each event may have a number of task achievements 506. If all event tasks are completed successfully, then the event is completed and marked completed in the game at 508. In a soccer game, event tasks for a game event may include items such as scoring a goal, scoring a goal against a particular user, or preventing any goals from being scored against your team. If there are no event task achievements, or the task achievements have been completed, a determination is made at 512 as to whether an event is done. If the event is not done a side event may be engaged at 510.

Once the narrative event is completed, the event is marked achieved at 516 and a next event in the story may be provided at 520. In 520, the next event is a virtual match between the users. This virtual event contributes to the story in the same manner that the location-based event 504 contributes to the story. Like the location-based event, each virtual event, in this case virtual match 520, may include virtual task achievements 522. If a virtual task achievement is present and achieved, the virtual event achievement may be stored at 524. If there are no virtual task achievements or the virtual task achievement is not achieved then a determination is made at 532 as to whether or not the event is completed. If the event is completed, the event is marked achieved at 534 and the next story event 536 is presented. Event 536 is a location-based event, requiring the users to play a physical game in the real world. The determination that a physical game occurred is discussed below.

Hence, virtual events and location-based events are linked to a common game theme, and both contributed to the game play. At any of the event point 512, 532 or 538, a user may attempt a side event 510, 530 and 542. In the context of a soccer game a side event may include training for a soccer game. Training in this example at 514 comprises running. If for example, a user 582 runs five miles, a location-based tracking system can determine the run of the user and add this to the user's side event achievement. Once the event is completed, the event is marked achieved at 526 and the system returns to the narrative at any point along the story line illustrated by events 504, 520 or 534.

Tracking virtual events is accomplished by communication between any of the user processing devices disclosed herein and the virtual event service 1032. Once a user is authenticated by the user authentication service 1060, the user playing a virtual soccer game on one of the user processing devices illustrated in FIG. 2, for example, can be tracked by the use of a particular game application on any one of the processing devices. Virtual events which have occurred can be stored and achievements noted by the game status and scoring service 1024. Tracking location-based events is performed in any number of ways.

FIG. 5A illustrates a location-based soccer game occurring between two users 582 and 584. In one embodiment, a location-based event is tracked by tracing a user's mobile processing device to a particular geographical location with any given tolerance. For example, once a user has authenticated their mobile device and identified the mobile device to the user tracking service, the fact that the mobile device is present at a particular soccer field for a given number of hours may be recognized as completing a soccer event.

In another alternative, sensors can be placed within different location-based elements. The example illustrated in FIG. 5A, sensors 590, 592 are illustrated on the soccer ball 586, another sensor 595 is illustrated as being in the soccer ball and other sensors 521 and 531 are provided on each respective user. The respective motions of each of the user, the ball with respect to the goal and sensors 590 and 592, can be provided to the user tracking service 1006 in order to determine with much greater accuracy whether a user has scored a goal, and the user is in fact playing the location-based event of soccer. Proximity sensors 590 and 592 can be utilized to determine whether a particular ball 595 has passed over a goal. Any number of other techniques may be utilized to recognize a location-based event, as described below. For example, location-based events such as running, training, weightlifting, can all be tracked to a particular location where such events might occur. The granularity of the location of a particular user with respect to either playing a soccer game, running, or the user's position with respect to other types of game events, such as collecting a virtual token, described below, can be augmented by use of the game application 39 located on any of one of the processing devices described herein.

Figure 7:
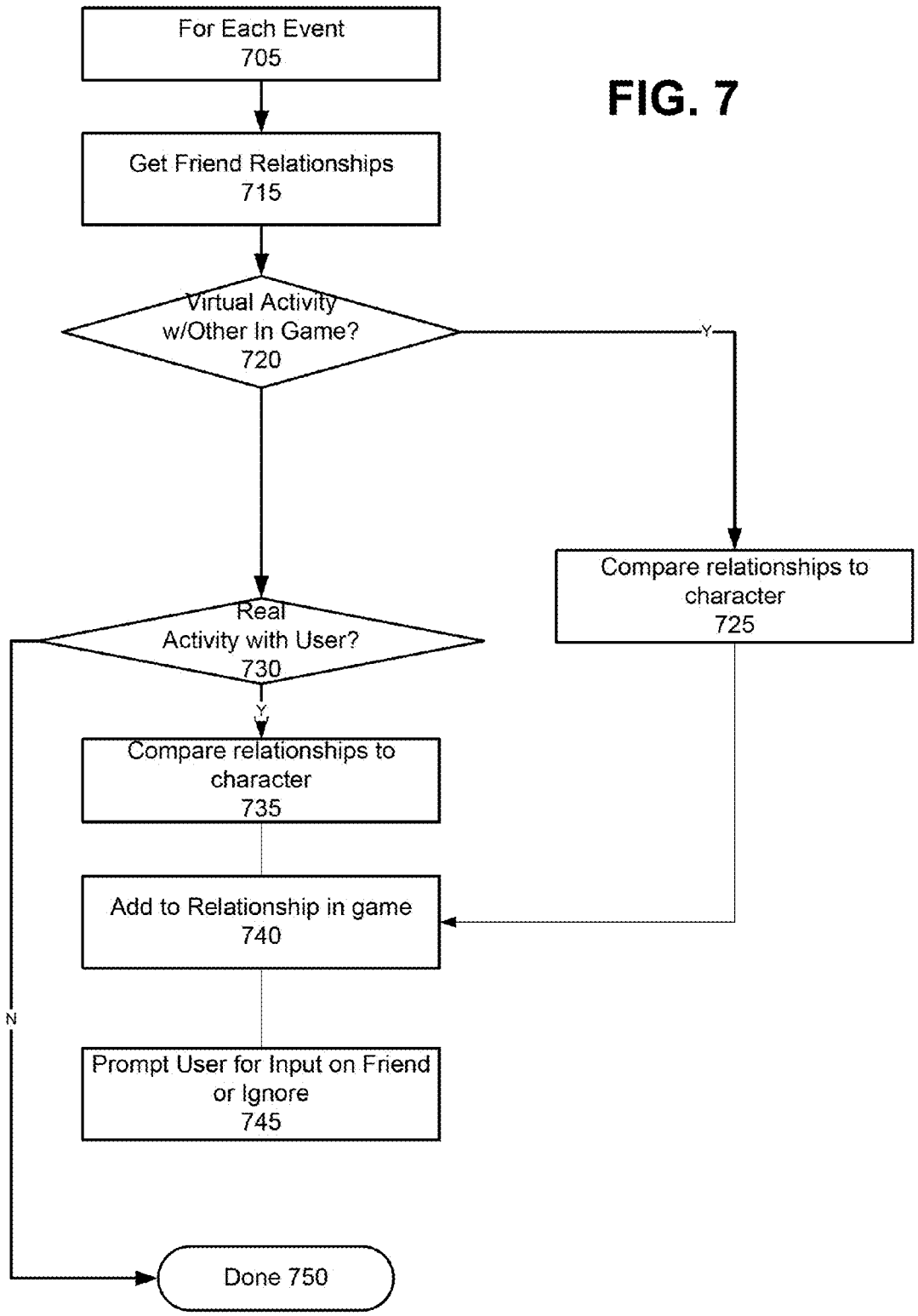
FIG. 7 illustrates the use of social networking information in conjunction with any of the events.

FIG. 7 illustrates the use of social networking information in conjunction with any of the events utilized in games provided and/or administered by the massively multi-player location-based game service 1000. For each event 705 in the game, friend relationships may be determined at 715. Friend relationships may be determined by reference to the user's social graph from external sources, or by explicitly defined games and teams such as team member records 1026 within a particular gaming application. Within the context of a game, a user will have a character. If virtual activity occurs with a friend or any other user having a defined relationship at 720, then the activity between the user and the user with whom the user has a relationship can be compared at 725. This comparison may determine, for example, whether a relationship between the virtual activity and the game activity should augment the relationship between the users. Likewise, when a real world activity occurs at 730, a comparison is made at 735 to determine whether or not the relationship merits augmenting the character with a defined relationship between the friend and the user. If, in either context, the comparison of 725, 735 results in a relationship, then the relationship is added at 740. If no relationship is determined based on the real or virtual activity, then the user may be prompted at 745 to determine whether or not the user wishes to explicitly define a relationship between the users.

For example, in the example illustrated above with respect to FIG. 5A, users 582 and 584 may have a virtual relationship of having played each other in a virtual soccer game without ever having played each other in a live event based game, alternatively, the users may have played each other several times in a live event based game. If based on location tracking services, the users determine that other real world events have occurred, such as, for example, the users attend a concert or meeting together, a further relationship between the users can be defined at 740. Historical relationships can be defined at 740 as well. For example, the fact that the users 582 and 584 have played each other in soccer several times, and user 582 has consistently scored goals on user 584, can affect the definition of user 584's character within any of the game contexts.

Figure 8:
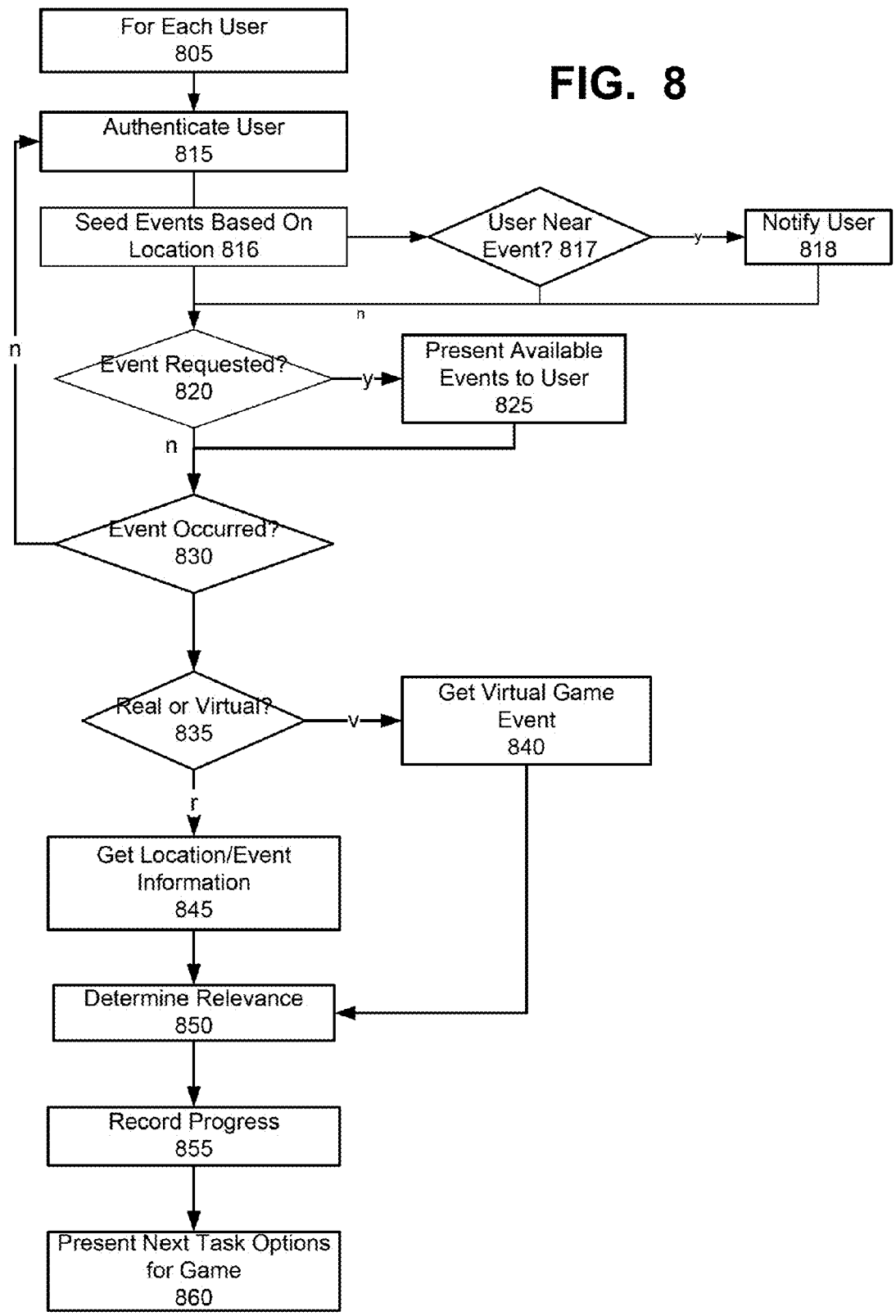
FIG. 8 is a general flow chart illustrating a virtual and local event combination process performed by the location-based game service.

FIG. 8 is a general flow chart illustrating a process performed by the location-based game service 1000 in order to combine location-based events and virtual events within a single gaming application. For each user at 805, the user is authenticated at 815 to uniquely identify the user to the location-based game service. Upon authentication at 815, user games which the user is participating in, may be retrieved.

In one embodiment, events for games a user is participating in or wishes to participate in are determined at 816 and if a user is near the event at 817, the user may be prompted to participate in the event. In one embodiment, events are seeded around the user based on the user location. In this context, events may be provided to a user's associated processing device based on the user location to prompt or encourage game play. Virtual events can be seeded as well as location-based events, using any number of notification mechanisms. Users may receive a text message or pop up window in a user interface. Users may see icons or virtual tokens appear in a mobile device interface. Where the event is a location-based event, a determination is made at 817 as to whether the user is near the event. Where the event is a virtual event, at 817 the determination may be one of whether the user is active on the processing device and in a mode where game play might be enabled.

In one embodiment, the user will be executing a game application on a processing device and may request an event at 820. When a user requests an event within a particular game, available events are presented to the user at 825. The process for presenting available events to a user is illustrated below in FIG. 14.

At 830, a determination is made as to whether a seeded or requested event was performed by the user. the occurrence of event may be recognized when a user performs either a virtual event or a location-based event. At 835, a determination is made as to whether or not the event is virtual or real. If the event is a virtual event, then at 840, the virtual event information is retrieved from the processing device, and its relevance will be determined at 850. If a real or location-based event has occurred at 835, then location and event information is retrieved at 845 and again relevance is determined at 850. Once relevance is determined at 850, progress is recorded at 855. Relevance includes a determination of whether or not the event was relevant to a particular story, narrative, or other event within the particular game application for which the event is defined. After game progress is recorded at 855 and next task options for the game may be presented at 860.

FIG. 9 illustrates a task selection interface 900 in, for example, a narrative based game. FIG. 9 illustrates one embodiment of a console based user interface, for example, wherein a plurality of locations 1322, 1324, 1326 are associated with particular tasks 1312, 1314 and 1316. In the example illustrated in FIG. 9, a map of San Francisco includes certain locations such as "Golden Gate Park," "AT&T Park," and "Monster Park." Events which may be selected within the context of a narrative based game may include "find the treasure in Golden Gate Park" 1312, "catch a fly ball at AT&T Park" 1314, or "find the football at Monster Park" 1316. In order to complete any one or more of the missions 1330 which are available via the selection interface, a user needs to travel to the given location illustrated on the map shown in the game environment user interface and complete a location-based task at the specific location. For example, to complete the" "find the treasure in Golden Gate Park" task 1312, a user needs to travel to the location illustrated at 1322 and look for a virtual treasure. The virtual treasure may be presented to the user via an augmented reality device as discussed below.

Location-based events can be identified by "tokens". In one embodiment, tokens may comprise one or more of locations, locations combined with times, locations combined with times and teammates, virtual representations of items within an interface signifying a location and/or time (such is icons 1322, 1324, 1326 above and coins 992, 994 and 996 below, or any indication, real or virtual, of a location-based event.

FIGS. 10A through 10C illustrate presenting a user 902 with a location-based event using an augmented reality view in a processing device. In FIG. 10A, a user 902 viewing a scene 904 of a tree 906 and picnic table 908 without any augmented reality device simply sees a tree 906 and a picnic table 908.

In FIG. 10B, a user can point a mobile processing device 950 having a field of view 960 at the same scene illustrated in FIG. 10A. As illustrated at user interface 952 of device 950, a virtual pointer 954 can be presented to the user by overlaying game data on the screen of a mobile processing device 950. In FIG. 10B, the item presented is a directional arrow which may indicate to user 902 that the user should proceed in the direction of the arrow in order to retrieve the treasure in Golden Gate Park as indicated by mission 1312.

FIG. 10C illustrates an alternative augmented reality presented to user 902, wherein a similar scene is presented showing the user viewing a scene 975 through a field of view 960 of a processing device 950, wherein instructions 965 are provided on the user interface 952 to "follow the coins." As the user moves in the direction of arrow 980, the user will cross the location of coins 992, 994 and 996, acquiring each of the coins as the user passes through the location defined by the coins. When the user reaches the treasure at 998, the user may touch, or physically pass through the treasure in order to acquire the treasure and complete the mission using the location-based reference points defined as the location-based events in the context of the game. It will be understood that any number of different types of location-based reference points or metrics may be utilized to make sure the user passes through or otherwise makes it to the particular location identified by the location-based event.

In addition, it should be understood that although the elements illustrated in FIG. 10A through 10C are virtual elements, the elements may also comprise real world elements. For example, a user may be directed to a local coffee shop to purchase a coffee drink. A user input for the particular location-based event of purchasing a drink at a coffee shop will include the position of the user at the coffee shop and, for example, an input by a coffee shop employee that the user has in fact utilized the game service at the coffee shop. When the user purchases a drink, the indicator by the coffee shop may include an entrance of a special code, using a bar scanner to identify the coffee shop purchase to the location-based gaming service 1000, or any of a number of other metrics to identify the fact that a purchase has occurred. Achievement will be completed when the user actually physically is present at the coffee shop and completes the purchase.

FIGS. 11A and 11B illustrate yet another alternative environment wherein an augmented reality is presented to the user. In FIG. 11A, without augmentation, a user views a billboard 1102 having an advertisement for a car 1104 thereon. When using the augmented reality device, such as augmented reality glasses 975 the user's view of the scene includes a game clue on screen 1165. In order to present a game clue to a user via the augmented reality interface of the processing device 950, or screen 1165 of glasses 975, a digital watermark may be utilized on billboard 1102. Alternatively, billboard 1102 may include one or more sensors such as those described above with respect to FIG. 5A, which indicate to the overlay engine in the application 39 that data should be applied on the billboard 1102. It will be recognized that billboard 1102 is merely exemplary and any number of different types of physical structures can be substituted for billboard 1102.

FIGS. 12 and 13 illustrate use of a multi-user mission, including a simultaneous multiuser mission. One or more of the location-based events utilized in the gaming applications provided by massively multi-player location-based game service 1000 may be required to be performed in teams of players. That is, multiple users may be required to be at the same, or different places, within a particular time period, or within sequential time periods, in order to complete an event. In FIG. 12, two users, 1202 and 1204 are positioned approximately three city blocks away from each other within a particular city at a given time.

As illustrated in FIG. 13, a joint task 1322 may require a first user to be present at a first location and a second user at a second location at the same time, at sequential times or at different but specific time. Such a task may be completed by first determining a first user location at 1324, determining a second user location at 1325, and determining whether a task is complete at 1326 by determining, for example, of the locations of users 1202 and 1204 are within a given tolerance of where the user should be, and whether the users are there at the correct times. Once the location sequence is complete, the event can be marked accomplished at 1330. While FIG. 12 illustrates two users, any number of different users may be required to complete a multi-user location-based event. Likewise, although users illustrated in FIG. 12 are illustrated as being present at the same time, the users may be present at sequential times, or within specific time periods as defined by the context of the event.

FIG. 14 illustrates a process which may be performed by the location-based game service 1000 in order to present available events to a user such as that described above with respect to step 825 in FIG. 8. When an event is requested at 820, at 1400, an applicable game is determined. An applicable game is, for a particular user, necessary to understand which type of event a user is requesting within the context of the game. This will depend on the user's progress within the game, and, in one embodiment, a specification by the user of a request for a location-based event or a virtual event. In another example, the user request at 820 may not be an actual request by the user, but can be provided to the user automatically based on the user's location and an opportunity e.g. a seeded event. For example, if the user is not actively playing the game, but is engaged in the user tracking service 1006 and is positioned at a location near a location-based event opportunity, the event requested may be performed by the game application itself, noticing that the opportunity exists for the users to complete a location-based event.

At 1405, the game story theme and/or narrative is retrieved. At 1410, events consistent with the theme or narrative, and the user's position with the story are retrieved. At 1415, a determination is made as to whether or not to offer the user a real or virtual event, or both. If a virtual event is offered, the user will be offered the opportunity to perform a virtual game element at 1420. The virtual game sequence can include, for example, playing a soccer match, or performing a video game play. In one embodiment, a virtual sequence can simply be loading a narrative based game at a particular level at the last saved point in the game that the user stored the game prior to exiting the game. If a real world event is chosen, a determination is made at 1425 as to whether or not the event is a local event or a distant event. A local event will within defined distance within which a user may realistically may be expected to perform events. For example, a user may wish to perform location-based events within a particular city or within a radius outside of the city, but may not wish to perform events in another state or at a distance greater than a certain distance from the user. If the event is a local event, then the user's location is determined at 1435, the user's game status is determined at 1445, and events within the user's local area are retrieved at 1450. If the event is a distant event at 1425, then one or more locations outside the user's local radius are determined or a random location is selected at 1430. In each instance, event options at the location selected are presented at 1440. Options include a single event mission, a joint event mission with other users, a single task for a particular event, or a multiple task for a particular event. The list of event options is merely exemplary and may vary widely based on the game type and narrative. Tasks and events may be any of those described herein.

Figure 15:
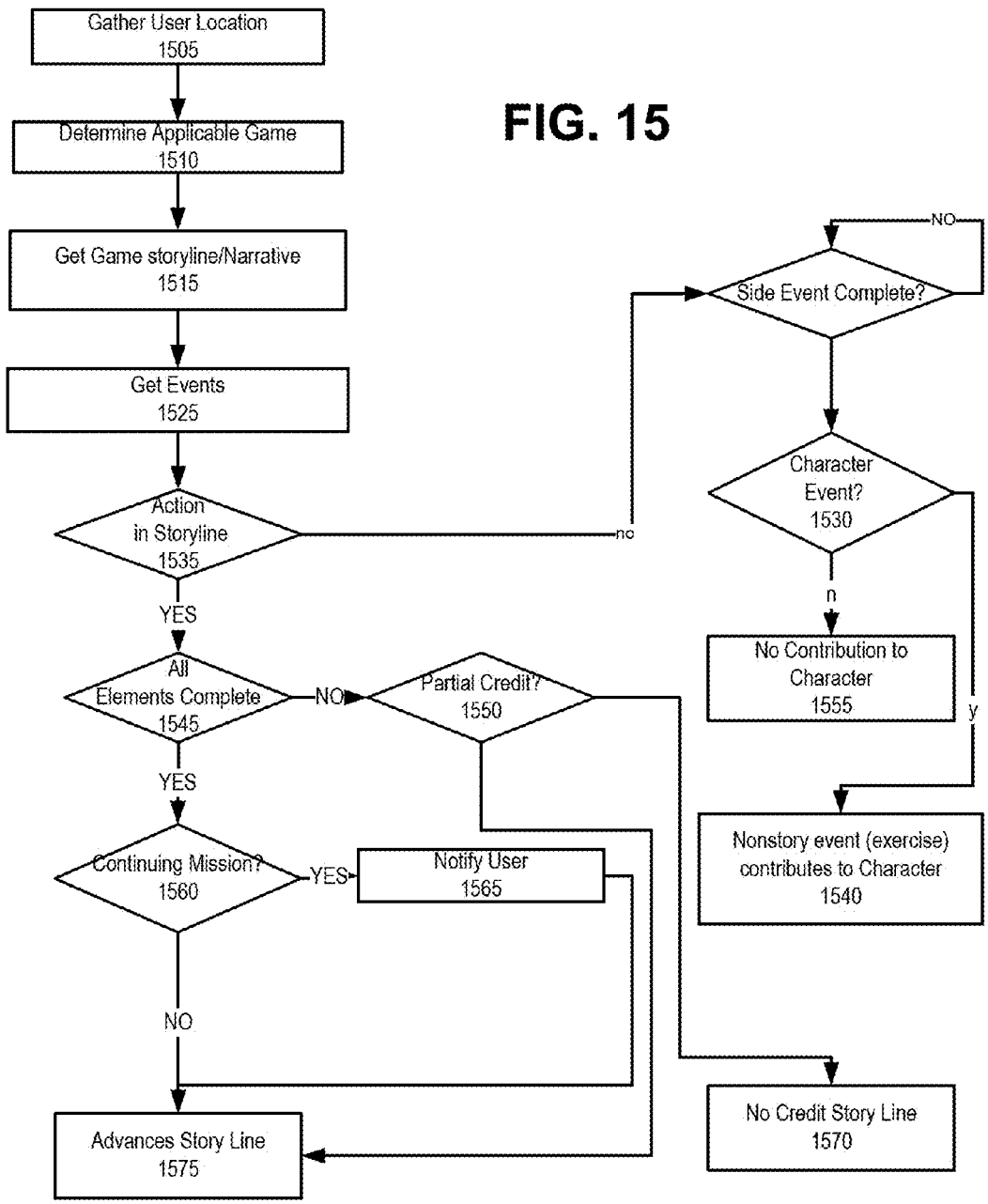
FIG. 15 is a flow chart illustrating a process for determining the relevance of location-based or virtual game event.

FIG. 15 illustrates a process for determining the relevance of location-based or virtual game event described above with respect to step 850. At 1505, a user location is determined. User location may not be relevant or needed in determination of a relevance of a virtual game event. At 1510, the applicable game for which a user is engaged is determined. The relevance of an event is tied to the game in which the event occurs. The game theme and narrative are retrieved at 1520. At 1525, the events which have occurred (at step 830 above) are retrieved. A determination is made at 1535 as to whether or not the events which are retrieved are relevant to the story line of the game. If the events are not part of the story line, they may present a side event at 1520. If the events are not a side event at 1520, then the events are meaningless within the context of the game and may be discarded at 1570. If the action is one which is relevant to the story line at 1535, then a determination is made at 1545 to ensure that all task elements of a particular event are complete. Elements may comprise tasks which may be performed in the context of an event. For example, if the event is a soccer game, then the task which may be required are to score more goals than your opponent in order to win the game. If all events are not complete, then a determination is made at 1550 as to whether or not it is possible to achieve partial credit. For example, in one embodiment, partial credit may be achieved for participating in the game, but not winning the game. If no partial credit is available, then no credit to the story line is provided at 1570. If partial credit is available, then the event advances the store line and the user achievement is marked at 855, above. If all elements are complete at 1545, a determination is made at 1560 as to whether or not the event is part of a continuing mission. If the event is part of a continuing mission, then the user may be notified at 1565. If not, then the event advances a story line at 1575.

If the event is a side event at 1550, then a determination is made at 1530 as to whether or not the event is a character event. For example, if the side event comprises running four miles, then the event may comprise a character event which adds to the character's skill at 1530. If the side event is relevant to the character, then the character is enhanced at 1540. If the event does not enhance the character, then no contribution to the character is recorded at 1555.

Figure 16:
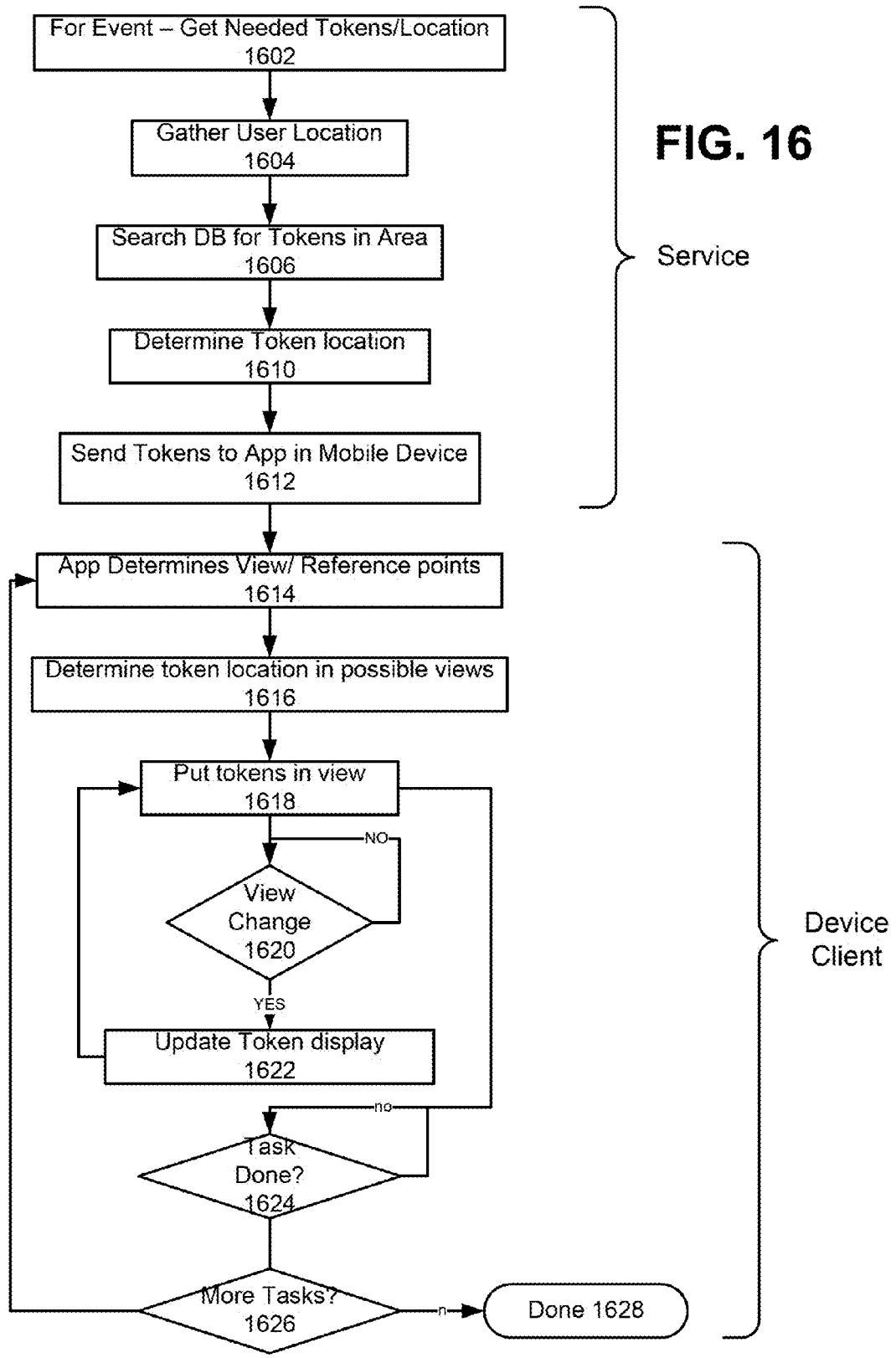
FIG. 16 is a flow chart illustrating a method to provide information to a game application 39 in order to allow a user to perform a location-based event.

FIG. 16 illustrates a method performed by massively multi-player location-based game service 1000 to provide information to a game application 39 in order to allow a user to perform a location-based event using an augmented reality service in the application 39. FIG. 16 illustrates elements provided by the service and by the application 39. Steps 1602 through 1610 are performed by the location-based game service.

At 1602, for each event, token locations are retrieved. At 1604, the user location is retrieved by the user tracking service 1006, and based on the tokens retrieved in 1602, tokens within the user's general area are retrieved at 1606. Tokens may comprise the elements illustrated in FIGS. 9, 10 and 11, above. Once a token location is determined at 1610, token locations are sent to a user's processing device at 1612. The augmented reality service in the game application 39 may perform steps 1614 through 1622. In the processing device, at 1614, the application determines the view and reference points that a user's phone or other augmented reality vice may be pointed towards. The reference points can be determined from the GPS information and/or image matching or geometric calculations determined by the granular geographic location calculator as described above. Using this information, the token location within the possible views presented by the user interface of the user's processing device are determined at 1616. At 1618, these tokens are put into the user interface view based on the view of the user interface at any particular time. If the view changes at 1620, the token display is updated at 1622. This continues until the task is completed at 1624. Additional tasks may be checked at 1626.

Figure 17:
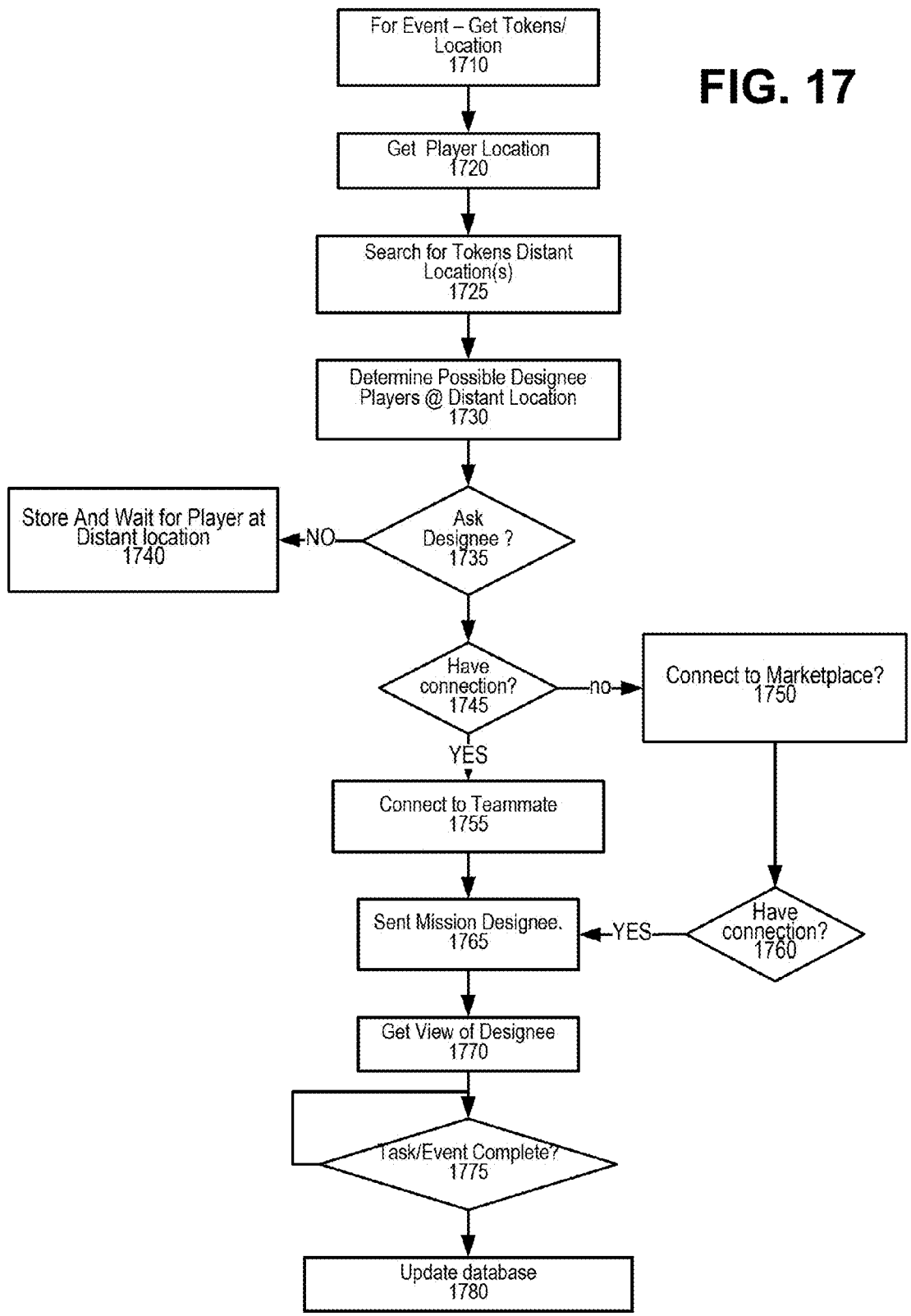
FIG. 17 illustrates a method performed by the location-based gaming service to provide a distant event to a user.

FIG. 17 illustrates a method performed by the location-based gaming service to provide a distant event to a user. Distant events are events outside a distance a user or system administrator of massively multi-player location-based game service 1000 has chosen as a suitable or desirable distance within which to perform location-based events.

For each event at 1710, required locations and tokens are retrieved. This step is similar to step 1602 except that a distant location is utilized. At 1720, the location of the requesting player is determined. The requesting player may be a player who is not performing a distance event, but for whom the distance event is relevant within the context or the play of the game. At 1725, location tokens in the distant location are retrieved. At 1730, the location of designee players within the distant location is determined.

In one context, a designee player is a player who may perform a task at the designation of a user. This allows users in local game context to perform location-based events at distances outside those which the user is comfortable performing location-based events. At 1735, determination is made as to whether or not the user wishes to ask a designee player. The designee player may be a user's friend, a stranger, or a user who is willing to perform the task in exchange for other services, via event exchange 1900 described below. If the user does not wish to ask a designee player, then at 1740, the information is stored and waits for the user to reach the distant location in order to perform the task.

If the user does wish to ask a designee player then at 1745 a determination is made as to whether or not the user has a connection with a particular designee user. As noted above, the designee user may be a user's friend, or other connection via any one or more of the social relationships discussed herein. If the user does not have a connection with any individuals, the user may wish to connect to a marketplace at 1750. If the user connects to the market place and establishes a connection with the user at 1760, a mission will be sent to the designee at 1765. If the user does wish to make a connection at 1745, then a connection to the user's designee will be made to the user designee at 1755 and the mission sent to the designee at 1765.

At 1770, a view may be provided of the designee via massively multi-player location-based game service 1000 to a user interface such as that illustrated in FIG. 9. Alternatively, a view of the distance user's field of view (e.g. 960) using the designee user's processing device may be provided. Using the user tracking service 1006, the position of the designee user can be relayed to the participating user based on any one of a number of tracking services described herein. Using this information, the designee user's accomplishment of the task can be relayed to the participating user. A determination is made at 1775 as to whether or not the task is complete and once the task is complete the system is updated at 1780.

Figure 18:
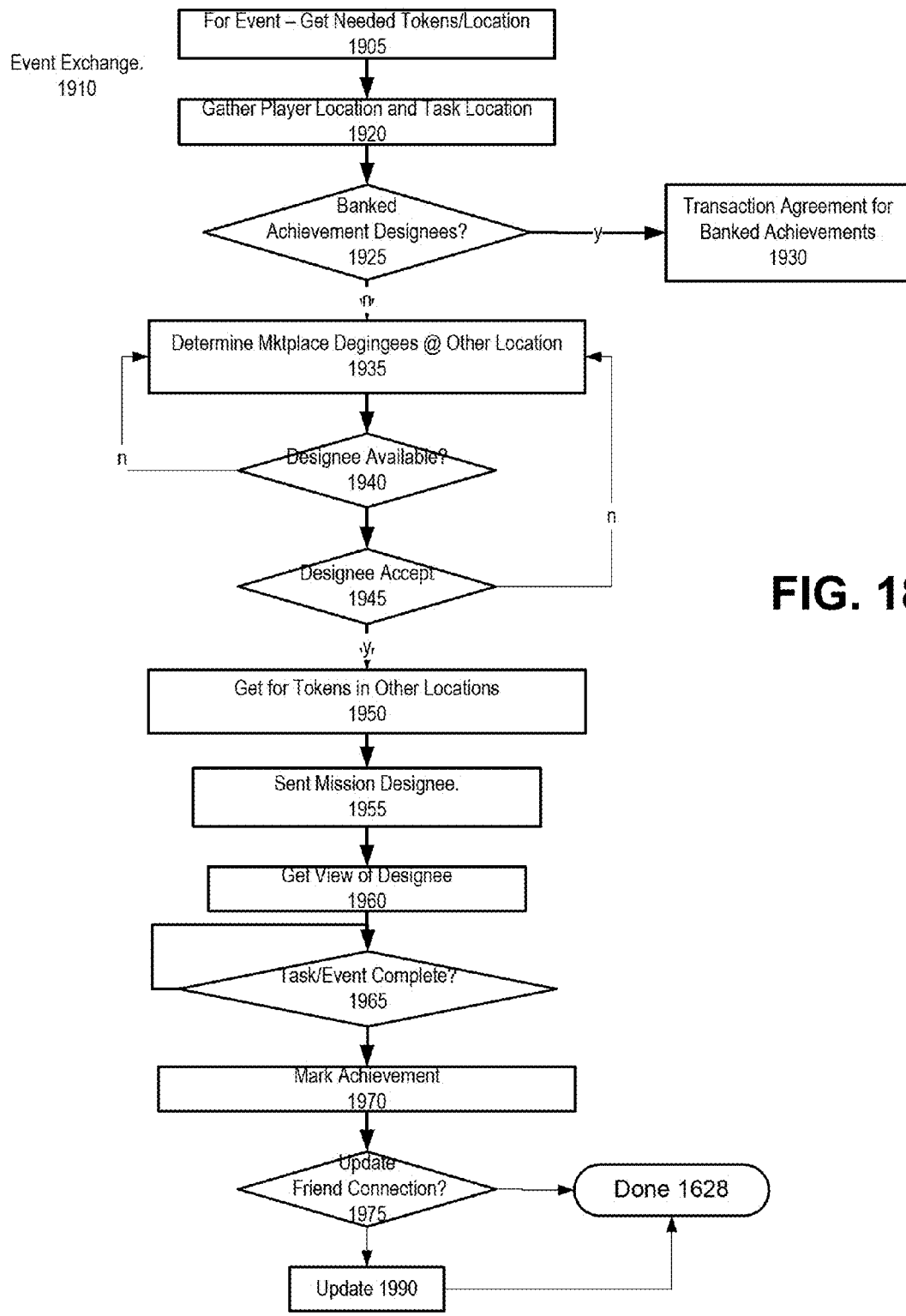
FIG. 18 illustrates a process implemented by a task exchange in accordance with the present technology.

FIG. 18 illustrates a process implemented by a event exchange 1900 in accordance with the present technology. For each event, tokens needed for a particular location are retrieved at 1905. This step is similar to step 1602 and 1710 above, but the location is a distance location where one or more designees are willing to perform tasks for other users not available at the task location. In 1920, the player's location is determined. At 1925, a determination is made as to whether or not designee users have banked achievements which may be utilized to complete the task. A banked achievement is one where a designee user has already performed the particular location-based task, possibly any number of different times, and is willing to use stored events and exchange them with other users via the marketplace. If banked achievements are present and a designee player is willing to exchange them, then a transaction agreement for banked achievements can be entered into at 1930 between the player and the designee player. If no banked achievements are present, or the designee player does not wish to use a banked achievement, then the designee players available at the distance location are determined at 1935. If a designee player is available at 1940, then a determination is made at 1945 as to whether or not the player is willing to accept the role of designee player for the user. If the designee player is willing to accept the role for the user, then a search of the tokens required in the distance location is made in 1950, and the mission is sent to the designee at 1955. A view of the designee player is retrieved at 1960 in accordance with the aforementioned description of step 1770 above, and a determination made at step 1965 as to whether or not the task has been completed. Once a task is completed, the achievement is updated at 1970. In 1975, the service determines whether or not the designee player and the user should be linked in some manner. For example, if the user and the designee player have used such other services, or exchange services or a particular number of occasions, a link between the users may be established. Acceptance at 1945 may be preconditioned on an exchange of location-based events between users, or some other form of payment.

The technology may be used in any number of systems and operating environments. Various processing devices are illustrated in FIGS. 19-22.

Figure 19:
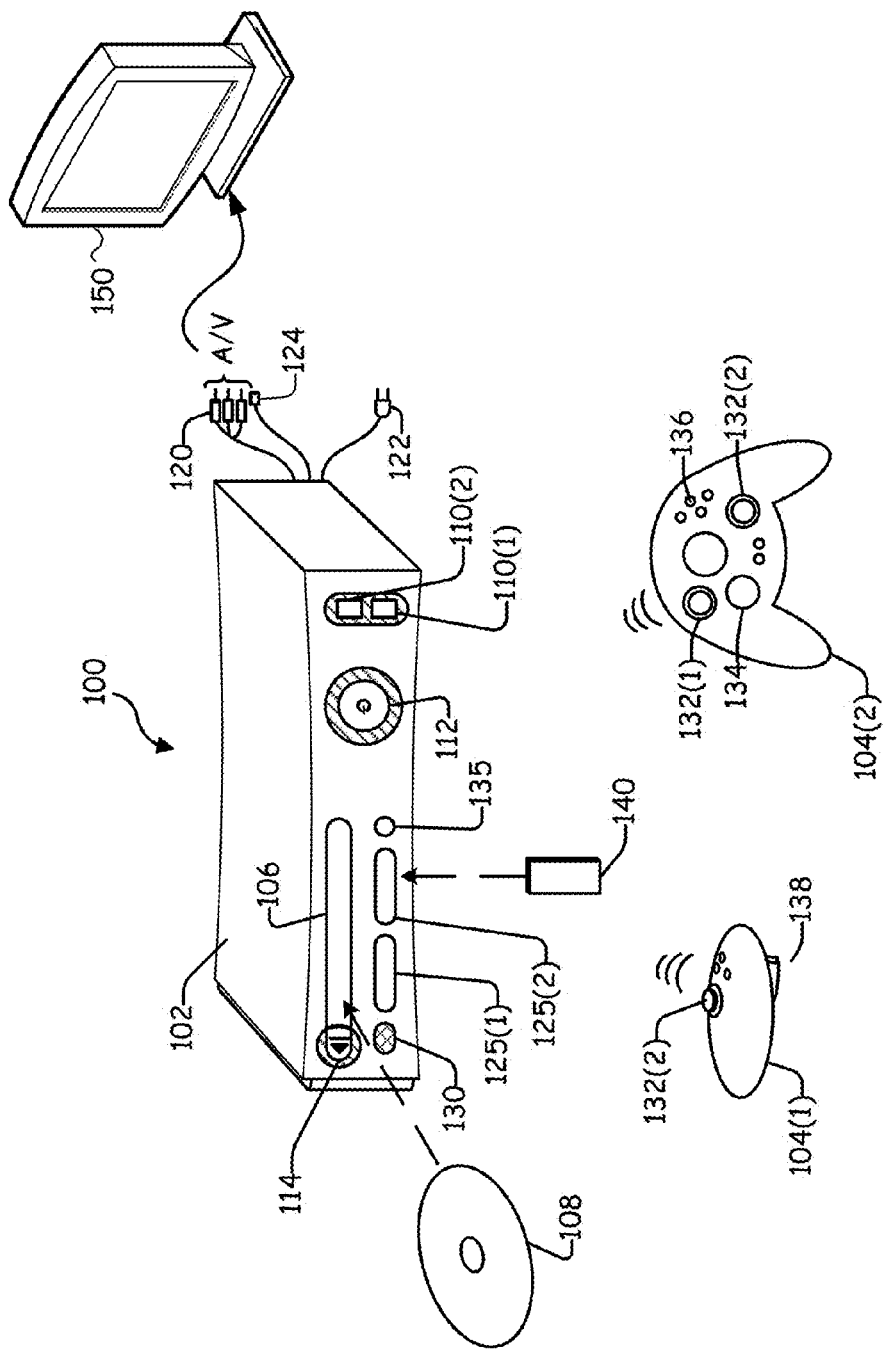
FIG. 19 shows an exemplary gaming and media system 100.

FIG. 19 shows an exemplary gaming and media system 100. The following discussion of FIG. 19 is intended to provide a brief, general description of a suitable environment in which concepts presented herein may be implemented. As shown in FIG. 19, gaming and media system 100 includes a game and media console (hereinafter "console") 102. In general, console 102 is one type of computing system, as will be further described below. Console 102 is configured to accommodate one or more wireless controllers, as represented by controllers 104(1) and 104(2). Console 102 is equipped with an internal hard disk drive (not shown) and a portable media drive 106 that support various forms of portable storage media, as represented by optical storage disc 108. Examples of suitable portable storage media include DVD, CD-ROM, game discs, and so forth. Console 102 also includes two memory unit card receptacles 125(1) and 125(2), for receiving removable flash-type memory units 140. A command button 135 on console 102 enables and disables wireless peripheral support.

As depicted in FIG. 19, console 102 also includes an optical port 132 for communicating wirelessly with one or more devices and two USB (Universal Serial Bus) ports 110(1) and 110(2) to support a wired connection for additional controllers, or other peripherals. In some implementations, the number and arrangement of additional ports may be modified. A power button 112 and an eject button 114 are also positioned on the front face of game console 102. Power button 112 is selected to apply power to the game console, and can also provide access to other features and controls, and eject button 114 alternately opens and closes the tray of a portable media drive 106 to enable insertion and extraction of a storage disc 108.

Console 102 connects to a television or other display (such as monitor 150) via A/V interfacing cables 120. In one implementation, console 102 is equipped with a dedicated A/V port (not shown) configured for content-secured digital communication using A/V cables 120 (e.g., A/V cables suitable for coupling to a High Definition Multimedia Interface "HDMI" port on a high definition monitor 150 or other display device). A power cable 122 provides power to the game console. Console 102 may be further configured with broadband capabilities, as represented by a cable or modem connector 124 to facilitate access to a network, such as the Internet. The broadband capabilities can also be provided wirelessly, through a broadband network such as a wireless fidelity (Wi-Fi) network.

Each controller 104 is coupled to console 102 via a wired or wireless interface. In the illustrated implementation, the controllers 104 are USB-compatible and are coupled to console 102 via a wireless or USB port 110. Console 102 may be equipped with any of a wide variety of user interaction mechanisms. In an example illustrated in FIG. 19, each controller 104 is equipped with two thumbsticks 132(1) and 132(2), a D-pad 134, buttons 136, and two triggers 138. These controllers are merely representative, and other known gaming controllers may be substituted for, or added to, those shown in FIG. 19.

In one implementation, a memory unit (MU) 140 may also be inserted into controller 104 to provide additional and portable storage. Portable MUs enable users to store game parameters for use when playing on other consoles. In this implementation, each controller is configured to accommodate two MUs 140, although more or less than two MUs may also be employed. In another embodiment, a Universal Serial Bus (USB) flash memory storage may also be inserted into controller 104 to provide additional and portable storage.

Gaming and media system 100 is generally configured for playing games stored on a memory medium, as well as for downloading and playing games, and reproducing pre-recorded music and videos, from both electronic and hard media sources. With the different storage offerings, titles can be played from the hard disk drive, from an optical disk media (e.g., 108), from an online source, or from MU 140.

During operation, console 102 is configured to receive input from controllers 104 and display information on display 150. For example, console 102 can display a user interface on display 150 to allow a user to perform the operations of the disclosed technology as discussed below.

Figure 20:
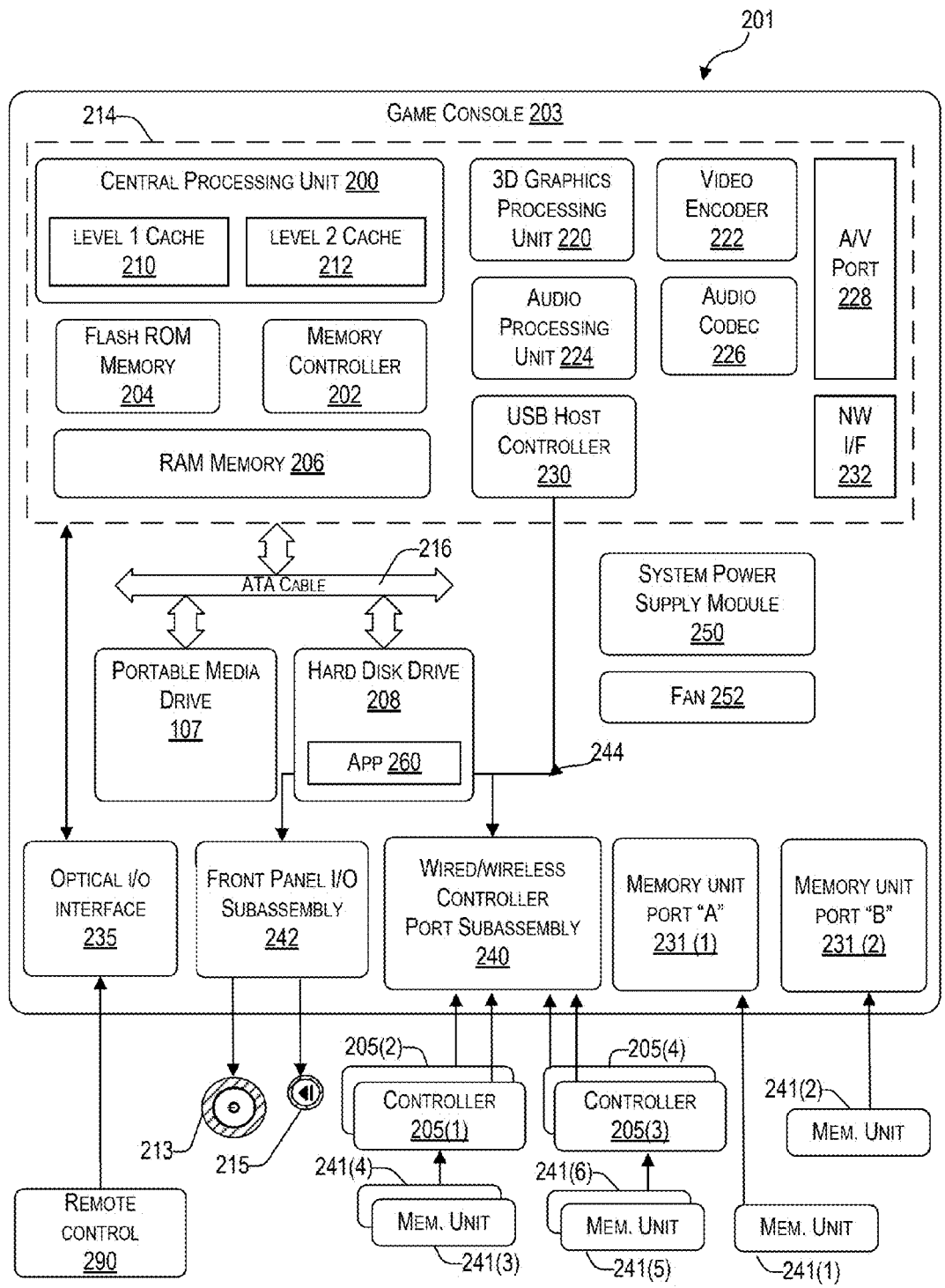
FIG. 20 is a functional block diagram of gaming and media system

FIG. 20 is a functional block diagram of gaming and media system 201 (such as system 100) and shows functional components of the gaming and media system 201 in more detail. Console 203 has a central processing unit (CPU) 200, and a memory controller 202 that facilitates processor access to various types of memory, including a flash Read Only Memory (ROM) 204, a Random Access Memory (RAM) 206, a hard disk drive 208, and portable media drive 107. In one implementation, CPU 200 includes a level 1 cache 210 and a level 2 cache 212, to temporarily store data and hence reduce the number of memory access cycles made to the hard drive 208, thereby improving processing speed and throughput.

CPU 200, memory controller 202, and various memory devices are interconnected via one or more buses (not shown). The details of the bus that is used in this implementation are not particularly relevant to understanding the subject matter of interest being discussed herein. However, it will be understood that such a bus might include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

In one implementation, CPU 200, memory controller 202, ROM 204, and RAM 206 are integrated onto a common module 214. In this implementation, ROM 204 is configured as a flash ROM that is connected to memory controller 202 via a PCI bus and a ROM bus (neither of which are shown). RAM 206 is configured as multiple Double Data Rate Synchronous Dynamic RAM (DDR SDRAM) modules that are independently controlled by memory controller 202 via separate buses (not shown). Hard disk drive 208 and portable media drive 107 are shown connected to the memory controller 202 via the PCI bus and an AT Attachment (ATA) bus 216. However, in other implementations, dedicated data bus structures of different types can also be applied in the alternative.

A three-dimensional graphics processing unit 220 and a video encoder 222 form a video processing pipeline for high speed and high resolution (e.g., High Definition) graphics processing. Data are carried from graphics processing unit 220 to video encoder 222 via a digital video bus (not shown). An audio processing unit 224 and an audio codec (coder/decoder) 226 form a corresponding audio processing pipeline for multi-channel audio processing of various digital audio formats. Audio data are carried between audio processing unit 224 and audio codec 226 via a communication link (not shown). The video and audio processing pipelines output data to an A/V (audio/video) port 228 for transmission to a television or other display. In the illustrated implementation, video and audio processing components 220-228 are mounted on module 214.

FIG. 20 shows module 214 including a USB host controller 230 and a network interface 232. USB host controller 230 is shown in communication with CPU 200 and memory controller 202 via a bus (e.g., PCI bus) and serves as host for peripheral controllers 205(1)-205(4). Network interface 232 provides access to a network (e.g., Internet, home network, etc.) and may be any of a wide variety of various wire or wireless interface components including an Ethernet card, a modem, a wireless access card, a Bluetooth module, a cable modem, and the like.

In the implementation depicted in FIG. 20, console 203 includes a controller support subassembly 240 for supporting four controllers 205(1)-205(4). The controller support subassembly 240 includes any hardware and software components needed to support wired and wireless operation with an external control device, such as for example, a media and game controller. A front panel I/O subassembly 242 supports the multiple functionalities of power button 213, the eject button 215, as well as any LEDs (light emitting diodes) or other indicators exposed on the outer surface of console 203. Subassemblies 240 and 242 are in communication with module 214 via one or more cable assemblies 244. In other implementations, console 102 can include additional controller subassemblies. The illustrated implementation also shows an optical I/O interface 235 that is configured to send and receive signals that can be communicated to module 214.

MUs 241(1) and 241(2) are illustrated as being connectable to MU ports "A" 231(1) and "B" 231(2) respectively. Additional MUs (e.g., MUs 241(3)-241(6)) are illustrated as being connectable to controllers 205(1) and 205(3), i.e., two MUs for each controller. Controllers 205(2) and 205(4) can also be configured to receive MUs (not shown). Each MU 241 offers additional storage on which games, game parameters, and other data may be stored. Additional memory devices, such as portable USB devices, can be used in place of the MUs. In some implementations, the other data can include any of a digital game component, an executable gaming application, an instruction set for expanding a gaming application, and a media file. When inserted into console 203 or a controller, MU 241 can be accessed by memory controller 202. A system power supply module 250 provides power to the components of gaming system 201. A fan 252 cools the circuitry within console 203.

An application 260 comprising machine instructions is stored on hard disk drive 208. When console 203 is powered on, various portions of application 260 are loaded into RAM 206, and/or caches 210 and 212, for execution on CPU 200, wherein application 260 is one such example. Various applications can be stored on hard disk drive 208 for execution on CPU 200.

Gaming and media system 201 may be operated as a standalone system by simply connecting the system to monitor a television, a video projector, or other display device. In this standalone mode, gaming and media system 201 enables one or more players to play games, or enjoy digital media, e.g., by watching movies, or listening to music. However, with the integration of broadband connectivity made available through network interface 232, gaming and media system 201 may further be operated as a participant in a larger network gaming community, as discussed in connection with FIG. 8.

Figure 21:
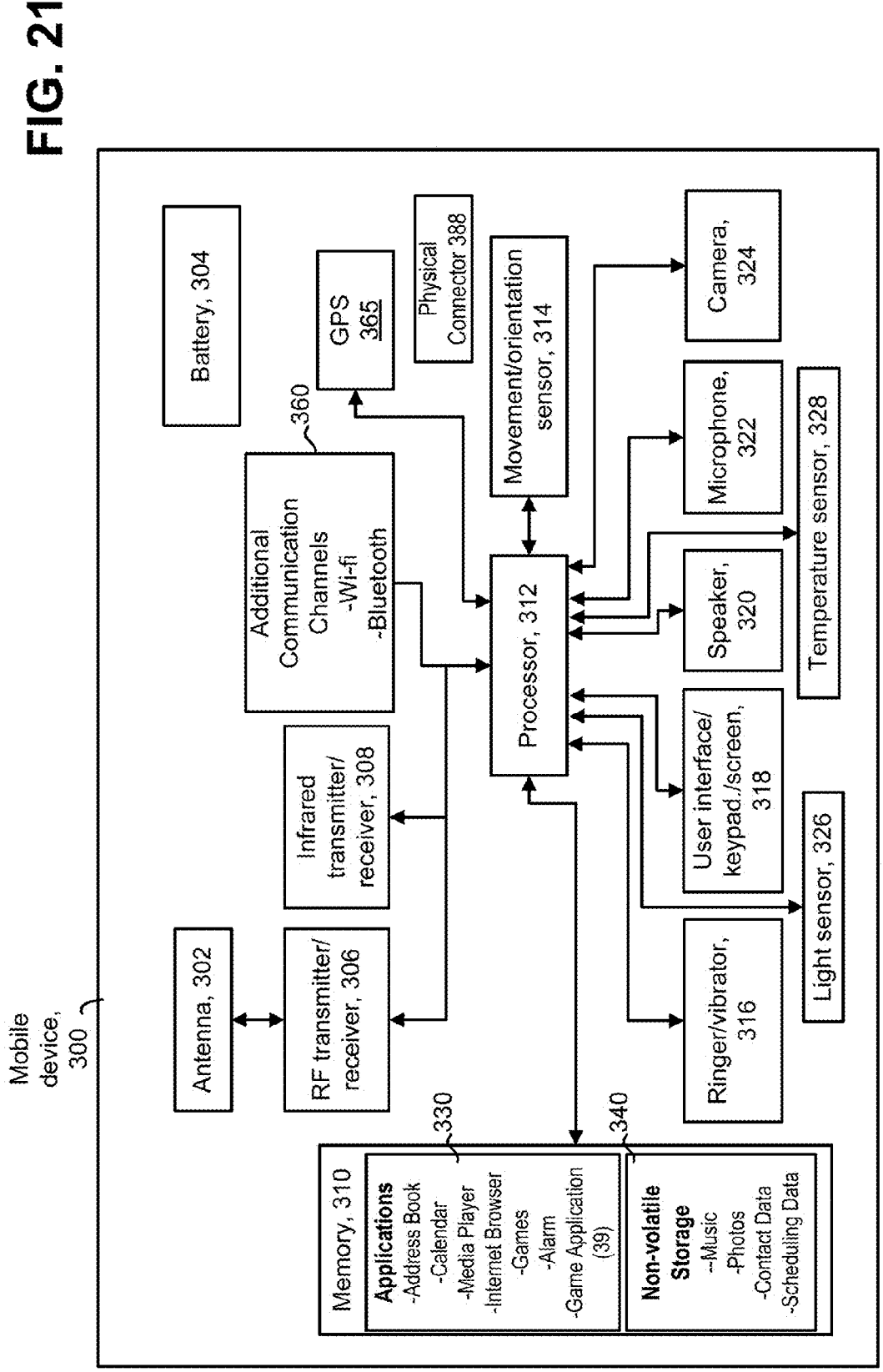
FIG. 21 depicts an example block diagram of a mobile device.

FIG. 21 depicts an example block diagram of a mobile device. Exemplary electronic circuitry of a typical m phone is depicted. The phone 300 includes one or more microprocessors 312, and memory 310 (e.g., non-volatile memory such as ROM and volatile memory such as RAM) which stores processor-readable code which is executed by one or more processors of the control processor 312 to implement the functionality described herein.

Mobile device 300 may include, for example, processors 312, memory 310 including applications and non-volatile storage. The processor 312 can implement communications, as well any number of applications, including the interaction applications discussed herein. Memory 310 can be any variety of memory storage media types, including non-volatile and volatile memory. A device operating system handles the different operations of the mobile device 300 and may contain user interfaces for operations, such as placing and receiving phone calls, text messaging, checking voicemail, and the like. The applications 330 can be any assortment of programs, such as a camera application for photos and/or videos, an address book, a calendar application, a media player, an internet browser, games, an alarm application, other third party applications, the interaction application discussed herein, and the like. The non-volatile storage component 340 in memory 310 contains data such as web caches, music, photos, contact data, scheduling data, and other files.

The processor 312 also communicates with RF transmit/receive circuitry 306 which in turn is coupled to an antenna 302, with an infrared transmitted/receiver 308, and with a movement/orientation sensor 314 such as an accelerometer and/or magnetometer. Accelerometers have been incorporated into mobile devices to enable such applications as intelligent user interfaces that let users input commands through gestures, indoor GPS functionality which calculates the movement and direction of the device after contact is broken with a GPS satellite, and to detect the orientation of the device and automatically change the display from portrait to landscape when the phone is rotated. An accelerometer can be provided, e.g., by a micro-electromechanical system (MEMS) which is a tiny mechanical device (of micrometer dimensions) built onto a semiconductor chip. Acceleration direction, as well as orientation, vibration and shock can be sensed. The processor 312 further communicates with a ringer/vibrator 316, a user interface keypad/screen 318, a speaker 320, a microphone 322, a camera 324, a light sensor 326 and a temperature sensor 328.

The processor 312 controls transmission and reception of wireless signals. During a transmission mode, the processor 312 provides a voice signal from microphone 322, or other data signal, to the transmit/receive circuitry 306. The transmit/receive circuitry 306 transmits the signal to a remote station (e.g., a fixed station, operator, other cellular phones, etc.) for communication through the antenna 302. The ringer/vibrator 316 is used to signal an incoming call, text message, calendar reminder, alarm clock reminder, or other notification to the user. During a receiving mode, the transmit/receive circuitry 306 receives a voice or other data signal from a remote station through the antenna 302. A received voice signal is provided to the speaker 320 while other received data signals are also processed appropriately.

Additionally, a physical connector 388 can be used to connect the mobile device 100 to an external power source, such as an AC adapter or powered docking station. The physical connector 388 can also be used as a data connection to a computing device. The data connection allows for operations such as synchronizing mobile device data with the computing data on another device.

A global positioning service (GPS) receiver 365 utilizing satellite-based radio navigation to relay the position of the user applications enabled for such service.

FIG. 22 illustrates an example of a suitable computing system environment 2200 such as a personal computer. With reference to FIG. 22, an exemplary system for implementing the technology includes a general purpose computing device in the form of a computer 2210. Components of computer 2210 may include, but are not limited to, a processing unit 2220, a system memory 2230, and a system bus 2221 that couples various system components including the system memory to the processing unit 2220. The system bus 2221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 2210 typically includes a variety of computer readable media. Computer readable media can be any available media that can be accessed by computer 2210 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 2210. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 2230 includes computer storage media in the form of volatile and/or nonvolatile memory such as read only memory (ROM) 2231 and random access memory (RAM) 2232. A basic input/output system 2233 (BIOS), containing the basic routines that help to transfer information between elements within computer 2210, such as during start-up, is typically stored in ROM 2231. RAM 2232 typically contains data and/or program modules that are immediately accessible to and/or presently being operated on by processing unit 2220. By way of example, and not limitation, FIG. 22 illustrates operating system 2234, application programs 2235, other program modules 2236, and program data 2237.

The computer 2210 may also include other removable/non-removable, volatile/nonvolatile computer storage media. By way of example only, FIG. 22 illustrates a hard disk drive 2240 that reads from or writes to non-removable, nonvolatile magnetic media, a magnetic disk drive 2251 that reads from or writes to a removable, nonvolatile magnetic disk 2252, and an optical disk drive 2255 that reads from or writes to a removable, nonvolatile optical disk 2256 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 2241 is typically connected to the system bus 2221 through an non-removable memory interface such as interface 2240, and magnetic disk drive 2251 and optical disk drive 2255 are typically connected to the system bus 2221 by a removable memory interface, such as interface 2250.

The drives and their associated computer storage media discussed above and illustrated in FIG. 22, provide storage of computer readable instructions, data structures, program modules and other data for the computer 2210. In FIG. 22, for example, hard disk drive 2241 is illustrated as storing operating system 2244, application programs 2245, other program modules 2246, and program data 2247. Note that these components can either be the same as or different from operating system 2234, application programs 2235, other program modules 2236, and program data 2237. Operating system 2244, application programs 2245, other program modules 2246, and program data 2247 are given different numbers here to illustrate that, at a minimum, they are different copies. A user may enter commands and information into the computer 20 through input devices such as a keyboard 2262 and pointing device 2261, commonly referred to as a mouse, trackball or touch pad. Other input devices (not shown) may include a microphone, joystick, game pad, satellite dish, scanner, or the like. These and other input devices are often connected to the processing unit 2220 through a user input interface 2260 that is coupled to the system bus, but may be connected by other interface and bus structures, such as a parallel port, game port or a universal serial bus (USB). A monitor 2291 or other type of display device is also connected to the system bus 2221 via an interface, such as a video interface 2290. In addition to the monitor, computers may also include other peripheral output devices such as speakers 2297 and printer 2296, which may be connected through a output peripheral interface 2290.

The computer 2210 may operate in a networked environment using logical connections to one or more remote computers, such as a remote computer 2280. The remote computer 2280 may be a personal computer, a server, a router, a network PC, a peer device or other common network node, and typically includes many or all of the elements described above relative to the computer 2210, although only a memory storage device 2281 has been illustrated in FIG. 22. The logical connections depicted in FIG. 22 include a local area network (LAN) 2271 and a wide area network (WAN) 2273, but may also include other networks. Such networking environments are commonplace in offices, enterprise-wide computer networks, intranets and the Internet.

When used in a LAN networking environment, the computer 2210 is connected to the LAN 2271 through a network interface or adapter 2270. When used in a WAN networking environment, the computer 2210 typically includes a modem 2272 or other means for establishing communications over the WAN 2273, such as the Internet. The modem 2272, which may be internal or external, may be connected to the system bus 2221 via the user input interface 2260, or other appropriate mechanism. In a networked environment, program modules depicted relative to the computer 2210, or portions thereof, may be stored in the remote memory storage device. By way of example, and not limitation, FIG. 22 illustrates remote application programs 2285 as residing on memory device 2281. It will be appreciated that the network connections shown are exemplary and other means of establishing a communications link between the computers may be used.

The technology is operational with numerous other general purpose or special purpose computing system environments or configurations. Examples of well known computing systems, environments, and/or configurations that may be suitable for use with the technology include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The technology may be described in the general context of computer-executable instructions, such as program modules, being executed by a computer. Generally, program modules include routines, programs, objects, components, data structures, etc. that perform particular tasks or implement particular abstract data types. The technology may also be practiced in distributed computing environments where tasks are performed by remote processing devices that are linked through a communications network. In a distributed computing environment, program modules may be located in both local and remote computer storage media including memory storage devices.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer implemented method of providing a game including a plurality of events comprising a story to a plurality of users, each user having one or more associated processing devices, comprising:

communicating first and second sets of real world location-based events, the first set of location-based events different from the second set of location-based events, contributing to user progress in the story to the plurality of users via the one or more associated processing devices, the processing devices configured to play in a virtual environment, each location based event in the first set of location-based events occurring at a location and comprising a user interaction with a real world object at the location during the game and the second set of location-based events occurring at the location and comprising the user interaction with a virtual world object in the virtual environment of the game;

communicating a set of virtual based events, different from the first and second sets of real world location-based events, contributing to user progress in the story to the plurality of users via the one or more associated processing devices, the virtual event comprising a user interaction with a virtual world object in the virtual environment of the game;

receiving, as input at the one or more associated processing devices, user participation based on location and interaction with the real world object at the location in at least one location-based event in at least one of the first and second sets of location-based events and receiving user participation in at least one virtual event;

tracking user progress in the story upon successful completion of each of the events, the tracking of the virtual events based upon completing individual achievements in a specified order to advance the game to a next event in the story; and presenting one or more additional location-based and virtual events via the one or more associated processing devices based on user progress.

2. The method of claim 1 wherein the story is a narrative and user progress includes advancing the story.

3. The method of claim 1 wherein the providing location-based events includes determining a user location and providing location-based events within a distance from the user location.

4. The method of claim 1 wherein one or more location-based events has a link to one or more associated virtual events.

5. The method of claim 4 wherein one or more location-based events includes one or more characteristics of a time, a presence, and a location the user meets to complete the event.

6. The method of claim 1 wherein the method further includes presenting one or more tokens indicating locations for location-based actions to a user via one or more of a map interface or an augmented reality interface.

7. The method of claim 6 wherein the location-based actions include capturing one or more of said tokens by tracking a user position relative to the tokens.

8. The method of claim 7 further including automatically providing one or more tokens in the augmented reality interface when a user is located in a location having the one or more tokens.

9. The method of claim 1 wherein the method further includes providing location-based events outside a distance from a user location and providing an event exchange allowing users to connect to designee players willing to complete events outside the distance from the user location.

10. The method of claim 1, wherein the presenting is further based on relationships established between two or more users determined by accessing the two or more user's social graph from external sources.

11. A computer implemented method providing a location and virtual based gaming environment to a plurality of users, each user having one or more associated processing devices, comprising:

communicating a first set of real world location-based events contributing to user progress in a story in an application to the plurality of users via the one or more associated processing devices, the processing devices configured to play in a virtual environment the location based event comprising a user interaction at the location with a real world object other than the associated processing device;

communicating a second set of real world location-based events, different from the first set of location-based events, contributing to the user progress in the story in the application to the plurality of users via the one or more associated processing devices, the location based event comprising a user interaction at the location with a virtual object displayed at the location;

communicating a set of virtual based events, different from the first and second sets of real world location-based events, contributing to the user progress in the story to the plurality of users via the one or more associated processing devices, the virtual event comprising the user interaction with the virtual world object in the virtual environment;

tracking user location to determine user participation and completion in one or more location-based events contributing to the user progress in the story, and a side event contributing to the user progress, thereby allowing the user to acquire skills in completion of the story;

tracking user performance of one or more virtual events performed on the one or more associated processing devices having an instance of the application and contributing to the user progress in the story;

determining user completion of at least one location-based event and at least one virtual event linked to the location-based event, the user completion identifiable by marking an event achievement, each of the at least one location-based event and at least one virtual event contributing to the user progress in the story; and updating the application to reflect the user progress of completing the events such that at least one of subsequent location-based events and virtual events are configured to be a next sequential event upon successful completion of the event achievement.

12. The method of claim 11 wherein tracking user location is performed by detecting user positioning information based on global positioning data provided by the processing device associated with the user.

13. The method of claim 12 wherein tracking user performance include one of tracking user location relative to one or more event based positioning tokens.

14. The method of claim 13 further including providing event based tokens to the processing device associated with the user by outputting one overlay information to the processing device.

15. The method of claim 14 further including notifying the user when a user location is proximate to a location-based event.

16. In a processing device including a processor and a user interface device, a computer readable medium including instructions for directing the processor to perform a method comprising:

receiving game event information from a location-based gaming service, the event information including a first set of real world location-based events at least a portion of which include contributing to user progress in a virtual game application, the first set of location based events comprising a user interaction with a real world object at a location; a second set of real world location-based events, different from the first set of location-based events, at least a portion of which contribute to the user progress in the virtual game application, the second set of location based event comprising a user interaction with a virtual object at a location; and a set of virtual based events, different from the first and second sets of real world location-based events, contributing to the user progress in the virtual game application, the virtual event comprising the user interaction with the virtual world object in the virtual environment as an input via the user interface device;

outputting the virtual game event information to the user interface device, the user interface having an input providing a view of a scene at the location and the processor rendering the event information on a representation of the scene in the user interface;

transmitting user location information to the gaming service, the location information including a user position;

notifying a user of availability of a location based event when a user is at a location; and tracking user performance of one or more virtual events performed via the user interface device and tracking user performance of location based events via the position of the processing device, the tracking including events contributing to the user progress in the virtual game application in which the user progress is based upon completing individual achievements in a specified order to advance the virtual game application to a next event in a story.

17. The computer readable medium of claim 16 wherein the method further includes receiving information on a scene in view of the user, the scene including geographic information regarding a user position and calculating a user location from the geographic information and orientation inputs to the processing device.

18. The computer readable medium of claim 17 wherein the receiving includes receiving one or more location-based events contributing to the user progress in the story and receiving one or more virtual based events contributing to the user progress in the story.

19. The computer readable medium of claim 18 wherein the method further includes receiving a plurality of side events, one or more of the side events comprising a location-based event and one or more of the side events comprising a virtual event.

20. The computer readable medium of claim 19 wherein the outputting further includes presenting one or more tokens indicating locations for location-based actions to a user via one or more of: a map interface or an augmented reality interface.

* * * * *